United States Patent
Arai et al.

(10) Patent No.: US 7,317,475 B2
(45) Date of Patent: Jan. 8, 2008

(54) RECORDING/PLAYBACK APPARATUS WITH TELEPHONE AND ITS CONTROL METHOD, VIDEO CAMERA WITH TELEPHONE AND ITS CONTROL METHOD, IMAGE COMMUNICATION APPARATUS, AND STORAGE MEDIUM

(75) Inventors: Hideyuki Arai, Kawasaki (JP); Kazuhiro Takahashi, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 10/861,471

(22) Filed: Jun. 7, 2004

(65) Prior Publication Data

US 2004/0218738 A1    Nov. 4, 2004

Related U.S. Application Data

(62) Division of application No. 09/301,145, filed on Apr. 28, 1999, now Pat. No. 6,775,361.

(30) Foreign Application Priority Data

| May 1, 1998 | (JP) | ................... 10-122245 |
| May 6, 1998 | (JP) | ................... 10-123682 |
| Jul. 1, 1998 | (JP) | ................... 10-186511 |

(51) Int. Cl.
| H04N 7/14  | (2006.01) |
| H04N 5/262 | (2006.01) |
| H04N 5/225 | (2006.01) |
| H04N 9/04  | (2006.01) |
| H04N 5/222 | (2006.01) |

*H04M 1/00* (2006.01)

(52) U.S. Cl. ............... 348/207.99; 348/376; 348/240.3; 348/333.01; 348/14.02; 455/556.1

(58) Field of Classification Search ................ 348/373, 348/374, 375, 376, 14.02, 14.03; 455/556.1
See application file for complete search history.

(56) References Cited

U.S. PATENT DOCUMENTS 5,236,199 A * 8/1993 Thompson, Jr. ............. 463/41
5,491,507 A * 2/1996 Umezawa et al. ........ 348/14.02

(Continued)

FOREIGN PATENT DOCUMENTS

EP    0 293 083 A2    11/1988

(Continued)

OTHER PUBLICATIONS

Patent Abstracts of Japan, vol. 1997, No. 3, dated Mar. 31, 1997, corresponding to JP 08 313799.

(Continued)

*Primary Examiner*—Lin Ye
*Assistant Examiner*—Richard M Bemben
(74) *Attorney, Agent, or Firm*—Morgan & Finnegan LLP

(57) ABSTRACT

This invention has as its object to appropriately inform the user of reception of an incoming call in accordance with the operation mode of a video camera upon arrival of call. To achieve this object, an apparatus has a telephone and video camera in a single housing, and comprises a device for muting a ringing tone during image sensing by the video camera.

46 Claims, 18 Drawing Sheets

TEL MODE

CAMERA MODE

U.S. PATENT DOCUMENTS

| | | | |
|---|---|---|---|
| 5,510,829 A * | 4/1996 | Sugiyama et al. | 348/14.01 |
| 5,550,754 A * | 8/1996 | McNelley et al. | 348/14.01 |
| 5,870,149 A * | 2/1999 | Comroe et al. | 348/474 |
| 5,987,106 A | 11/1999 | Kitamura | |
| 6,009,336 A * | 12/1999 | Harris et al. | 455/566 |
| 6,044,279 A | 3/2000 | Hokao et al. | |
| 6,111,604 A * | 8/2000 | Hashimoto et al. | 348/220.1 |
| 6,278,884 B1 * | 8/2001 | Kim | 455/556.1 |
| 6,535,243 B1 * | 3/2003 | Tullis | 348/207.1 |
| 6,574,471 B1 | 6/2003 | Rydbeck | |
| 6,985,169 B1 * | 1/2006 | Deng et al. | 348/61 |
| 7,006,146 B1 * | 2/2006 | Tanaka et al. | 348/376 |
| 7,092,009 B2 * | 8/2006 | Patel et al. | 348/207.1 |
| 2002/0075395 A1 * | 6/2002 | Ohkawara | 348/347 |

FOREIGN PATENT DOCUMENTS

| | | |
|---|---|---|
| EP | 0 293 083 A3 | 7/1990 |
| EP | 0 649 252 A2 | 4/1995 |
| EP | 0 649 252 A3 | 7/1995 |
| EP | 0 772 334 A2 | 5/1997 |
| EP | 0 772 334 A3 | 3/1999 |
| JP | 9-307631 | 11/1987 |
| JP | 4-266287 | 2/1991 |
| JP | 3-109891 | 9/1991 |
| JP | 4-042672 | 2/1992 |
| JP | A 5-130196 | 5/1993 |
| JP | 5-63160 | 8/1993 |
| JP | 6-046413 | 2/1994 |
| JP | 06141226 A | 5/1994 |
| JP | 6-205274 | 7/1994 |
| JP | 06-318984 A | 11/1994 |
| JP | A 7-123131 | 5/1995 |
| JP | 7-283993 | 10/1995 |
| JP | 07271252 A | 10/1995 |
| JP | 08205021 A | 8/1996 |
| JP | 8-228382 | 9/1996 |
| JP | 08265630 A | 10/1996 |
| JP | 8-294030 | 11/1996 |
| JP | 08 313799 | 11/1996 |
| JP | 9-116886 | 2/1997 |
| JP | 10-028289 | 1/1998 |
| JP | 10093806 A | 4/1998 |
| JP | 2-95090 | 9/1998 |
| JP | 10-336498 | 12/1998 |
| WO | 95/31863 | 11/1995 |

OTHER PUBLICATIONS

European Patent Office Communication, Application No. 99108702.4-2219; dated Dec. 17, 2001.

European Seach Report, Application No. EP 99 10 8702; Date of Completion of Search: Dec. 7, 2001.

Annex to the European Search Report on European Patent Application No. EP 99 10 8702; dated Dec. 7, 2001.

Patent Abstract of Japan corresponding to JPA 7-123131.

Patent Abstract of Japan corresponding to JPA 5-130196.

Japanese Office Action dated Nov. 25, 2002 (of Japanese Patent Application No. 11-368373, which is a divisional application of Japanese Application No. 10-186511).

English translation corresponding to the Japanese Office Action dated Nov. 25, 2002.

Japanese Office Action dated Apr. 23, 1999 for Japanese Patent Application No. 10-186511.

Japanese Office Action dated Apr. 23, 1999 for Japanese Patent Application No. 10-123682.

Final Rejection dated Jul. 13, 2001 of basic Japanese Patent Application No. 11-176006 which is a divisional application of basic Japanese Patent Application No. 10-123682.

* cited by examiner

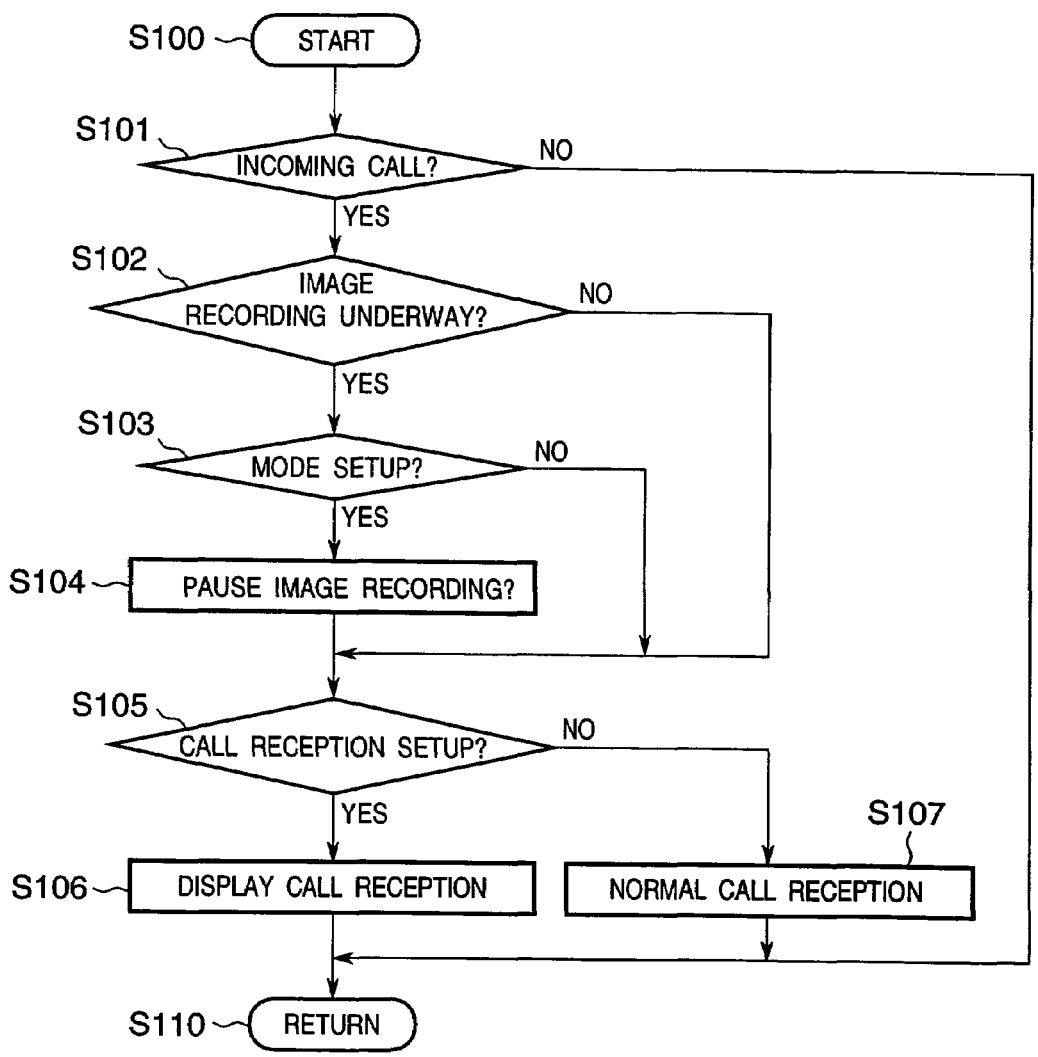

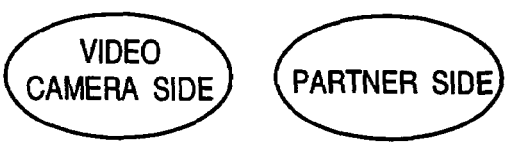

RECORDING/PLAYBACK APPARATUS WITH TELEPHONE AND ITS CONTROL METHOD, VIDEO CAMERA WITH TELEPHONE AND ITS CONTROL METHOD, IMAGE COMMUNICATION APPARATUS, AND STORAGE MEDIUM

This is divisional of application Ser. No. 09/301,145, filed Apr. 28, 1999 now U.S. Pat. No. 6,775,361.

BACKGROUND OF THE INVENTION

The present invention relates to a recording/playback apparatus with telephone and its control method, a video camera with telephone and its control method, an image communication apparatus, and a storage medium.

Since a conventional video camera and telephone are used for different purposes, they have independent product forms. In recent years, upon development of semiconductors, communication techniques, and the like, proliferation of the information industries represented by the Internet, broadening of the range of consumers' needs, and so on, various product forms have emerged. Even in a video camera, there are needs to not only for a photographer or a person whose image is sensed personally observe the image, but also to quickly transmit video data as a kind of information to a broad range of recipients via a public line.

However, since information sensed by a video camera is temporarily saved in a recording medium, and is then transmitted via the public line, troublesome operation for the operator for connecting a device such as a telephone or the like and the video camera via an interface device, and transmitting information, and a special device therefor are required. Also, on the receiving side of that information, some device for receiving the information, cumbersome operation for waiting for the information after preparation for receiving the information, and a special device therefor are required.

As a method of solving this problem, a device that integrates a camera and telephone, which is called a videophone, has been developed.

FIG. 1 shows the arrangement of a conventional videophone.

Referring to FIG. 1, reference numeral 1 denotes a lens; 2, a stop of the lens; 3, a motor for driving a zoom lens; 4, a driving means for driving the zoom lens; 5, a motor for driving the stop; 6, a driving means for driving a stop mechanism; 7, a motor for driving a focus lens; and 8, a driving means for driving the focus lens.

Reference numeral 9 denotes an image sensing element (CCD); 10, a CDS/AGC circuit for sampling & holding a video signal output from the image sensing element, and performing AGC (auto gain control) of the video signal; 11, an A/D converter for converting an analog signal into a digital signal; 12, a camera signal processing circuit for processing luminance and color signals to obtain an appropriate video signal; and 13, an image compression/expansion circuit for compressing/expanding an image. The image compression/expansion circuit 13 uses, for example, JPEG, H263, a DV format, or the like.

Reference numeral 14 denotes a memory; 15, a communication protocol circuit; 16, a PHS transmitter/receiver; 17, a microcomputer; 18, a D/A converter for converting a digital signal into an analog signal; 19, an antenna; 20, a monitor (or a liquid crystal display device); 21, a key discrimination circuit; and 22, a ten-key pad for inputting a telephone number.

Reference numeral 23 denotes a microphone; 24, an audio signal processing circuit for processing an audio signal input from the microphone to obtain an appropriate signal; and 25, an A/D converter for converting an analog audio signal into a digital signal.

The operation of the above arrangement will be explained below.

Incoming light from an object via the lens 1 is photoelectrically converted into an electrical signal by the image sensing element 9. The electrical signal is processed by the camera signal processing circuit 12 to obtain a video signal. Furthermore, the video data is compressed by the image compression/expansion circuit 13, and the compressed data is stored in the memory 14.

The data compressed by the image compression/expansion circuit 13 is processed by the communication protocol circuit 15 to obtain data according to a prescribed communication protocol, and the processed data is transmitted from the antenna 19 via the PHS transmitter/receiver 16. The data output from the camera signal processing circuit 12 is converted into an analog signal by the D/A converter 18, and the analog signal is processed to be displayed on the monitor. After that, an image is output to the monitor.

Moreover, image and audio radio signals transmitted from an external device are received by the PHS transmitter/receiver 16 via the antenna 19, and image and audio data are obtained via the communication protocol circuit 15. The image data is then expanded by the image compression/expansion circuit 13, and is output to the monitor via the D/A converter 18.

The microcomputer 17 controls the system of this apparatus, and performs various kinds of lens control (control of the focus lens, zoom lens, and stop), camera signal processing control, communication control, key control, and the like.

The ten-key pad 22 is used for inputting a telephone number of the called party upon placing a call, and the discrimination circuit 21 discriminates the input key. The output from the discrimination circuit 21 is input to the microcomputer 17, which executes a series of control processes for placing a call.

The same applies to an audio signal. That is, after a voice is input from the microphone 23, the audio signal is processed by the audio signal processing circuit 24, and is input to the communication protocol circuit 15 via the audio A/D converter 25. After that, the audio signal is transmitted as a radio signal from the antenna 19 via the PHS transmitter/receiver as in the video signal.

However, the conventional videophone has no special function, e.g., a function of automatically adjusting the focus on a person designated on a screen, or a function of optimizing exposure of a person designated on the screen, upon sensing an image by the camera. Even if such functions are available, they are not suitable for a product like a videophone for which a compact structure is of prime importance, since operation keys therefore must be added.

Also, in the conventional videophone, since the function of placing a call and a function of sensing an image by the camera are simultaneously executed, the battery is used up soon. In addition, an operation means for placing a call, and an operation means for sensing a camera image are separately present, and such means are not suitable for a product like a videophone for which a compact structure is of prime importance, since operation keys therefore must be further added.

SUMMARY OF THE INVENTION

The present invention has been made in consideration of the conventional problems, and has as its object to improve the operability of both a recording/playback apparatus or video camera with a telephone function, and the telephone function.

It is another object of the present invention to provide an image communication apparatus which can automatically adjust the focus on a designated object.

It is still another object of the present invention to provide an image communication apparatus which can optimize the exposure value of a designated object.

It is still another object of the present invention to provide an image communication apparatus which can enlarge or reduce the image of a designated object.

It is still another object of the present invention to provide an image communication apparatus which can easily select a menu displayed on a monitor.

It is still another object of the present invention to provide an image communication apparatus which can be rendered compact by reducing the number of operation keys.

In order to solve the aforementioned problems and to achieve the above objects, a recording/playback apparatus with telephone according to the present invention is characterized by the following arrangement.

That is, a recording/playback apparatus with telephone, which has a telephone and recorder/player in a single housing, comprises means for muting a ringing tone upon reception of a call during recording by the recorder/player.

A video camera with telephone according to the present invention is characterized by the following arrangement according to its first aspect.

That is, a video camera with telephone, which has a telephone and video camera in a single housing, comprises means for muting a ringing tone upon reception of a call during image sensing by the video camera.

A video camera with telephone according to the present invention is characterized by the following arrangement according to its second aspect.

That is, a video camera with telephone, which has a telephone and video camera in a single housing, comprises means for pausing image sensing of the video camera upon reception of a call during image sensing by the video camera.

A video camera with telephone according to the present invention is characterized by the following arrangement according to its third aspect.

That is, a video camera with telephone, which has a telephone and video camera in a single housing, comprises means for stopping various call reception informing functions that disturb image sensing, and displaying a call reception message on a display, upon reception of a call during image sensing by the video camera.

A video camera with telephone according to the present invention is characterized by the following arrangement according to its fourth aspect.

That is, a video camera with telephone, which has a telephone and video camera in a single housing, comprises selection means for selecting a function of stopping various call reception informing functions that disturb image sensing, and displaying a call reception message on a display, upon reception of a call during image sensing by the video camera.

A method of controlling a recording/playback apparatus with telephone according to the present invention is characterized by the following arrangement.

That is, a method of controlling a recording/playback apparatus with telephone, comprises the step of muting a ringing tone upon reception of a call during recording by the recording/playback apparatus.

A method of controlling a video camera with telephone according to the present invention is characterized by the following arrangement according to its first aspect.

That is, a method of controlling a video camera with telephone, comprises the step of muting a ringing tone upon reception of a call during image sensing by the video camera.

A method of controlling a video camera with telephone according to the present invention is characterized by the following arrangement according to its second aspect.

That is, a method of controlling a video camera with telephone, comprises the step of pausing image sensing of the video camera upon reception of a call during image sensing by the video camera.

A method of controlling a video camera with telephone according to the present invention is characterized by the following arrangement according to its third aspect.

That is, a method of controlling a video camera with telephone, comprises the step of stopping various call reception informing functions that disturb image sensing, and displaying a call reception message on a display, upon reception of a call during image sensing by the video camera.

A method of controlling a video camera with telephone according to the present invention is characterized by the following arrangement according to its fourth aspect.

That is, a method of controlling a video camera with telephone, comprises the step of selecting a function of stopping various call reception informing functions that disturb image sensing, and displaying a call reception message on a display, upon reception of a call during image sensing by the video camera.

A storage medium according to the present invention is characterized by the following arrangement according to its first aspect.

That is, a storage medium stores a program for implementing a method of controlling a recording/playback apparatus with telephone of a method of controlling a recording/playback apparatus with telephone, comprising the step of muting a ringing tone upon reception of a call during recording by the recording/playback apparatus.

A storage medium according to the present invention is characterized by the following arrangement according to its second aspect.

That is, a storage medium stores a program for implementing a method of controlling a video camera with telephone of a method of controlling a video camera with telephone, comprising the step of muting a ringing tone upon reception of a call during image sensing by the video camera.

A storage medium according to the present invention is characterized by the following arrangement according to its third aspect.

That is, a storage medium stores a program for implementing a method of controlling a video camera with telephone of a method of controlling a video camera with telephone, comprising the step of pausing image sensing of the video camera upon reception of a call during image sensing by the video camera.

A storage medium according to the present invention is characterized by the following arrangement according to its fourth aspect.

That is, a storage medium stores a program for implementing a method of controlling a video camera with telephone of a method of controlling a video camera with telephone, comprising the step of stopping various call reception informing functions that disturb image sensing, and displaying a call reception message on a display, upon reception of a call during image sensing by the video camera.

A storage medium according to the present invention is characterized by the following arrangement according to its fifth aspect.

That is, a storage medium stores a program for implementing a method of controlling a video camera with telephone of a method of controlling a video camera with telephone, comprising the step of selecting a function of stopping various call reception informing functions that disturb image sensing, and displaying a call reception message on a display, upon reception of a call during image sensing by the video camera.

An image communication apparatus according to the present invention is characterized by the following arrangement according to its first aspect.

That is, an image communication apparatus comprises an image sensing element for photoelectrically converting light coming from an object, and outputting an image signal, focusing means for focusing the light coming from the object on the image sensing element, focus adjustment means for adjusting a focus position of the focusing means, display means for displaying at least an image sensed by the image sensing element, area setting means for setting an area including an object image to be focused on the image sensing element on a screen of the display means, driving means for driving the focus adjustment means to focus the object image in the area set by the area setting means on the image sensing means, transmission means for transmitting data including an image signal sensed by the image sensing element by radio, and reception means for receiving data from another apparatus by radio.

An image communication apparatus according to the present invention is characterized by the following arrangement according to its second aspect.

That is, an image communication apparatus comprises an image sensing element for photoelectrically converting light coming from an object, and outputting an image signal, focusing means for focusing the light coming from the object on the image sensing element, stop adjustment means for adjusting a stop of the focusing means, display means for displaying at least an image sensed by the image sensing element, area setting means for setting an area including an object image, which is to have an appropriate exposure value on the image sensing element, on a screen of the display means, driving means for driving the stop adjustment means to obtain an appropriate exposure value of the object image in the area set by the area setting means on the image sensing means, transmission means for transmitting data including an image signal sensed by the image sensing element by radio, and reception means for receiving data from another apparatus by radio.

An image communication apparatus according to the present invention is characterized by the following arrangement according to its third aspect.

That is, an image communication apparatus comprises an image sensing element for photoelectrically converting light coming from an object, and outputting an image signal, display means for displaying at least an image sensed by the image sensing element, image enlargement/reduction means for enlarging or reducing an image on the display means, area setting means for setting an area including an object image to be enlarged to reduced on a screen of the display means, control means for controlling the image enlargement/reduction means to enlarge or reduce the object image in the area set by the area setting means, transmission means for transmitting data including an image signal sensed by the image sensing element by radio, and reception means for receiving data from another apparatus by radio.

An image communication apparatus according to the present invention is characterized by the following arrangement according to its fourth aspect.

That is, an image communication apparatus comprises an image sensing element for photoelectrically converting light coming from an object, and outputting an image signal, display means for displaying at least an image sensed by the image sensing element and/or a character, selection means for displaying a menu used for selecting or executing one of a plurality of functions on the display means, and selecting a predetermined function from the displayed menu, transmission means for transmitting data including an image signal sensed by the image sensing element by radio, and reception means for receiving data from another apparatus by radio.

In the image communication apparatus according to the present invention, the display means further displays an image signal in the data received from the other apparatus.

An image communication apparatus according to the present invention is characterized by the following arrangement according to its fifth aspect.

That is, an image communication apparatus comprises image sensing means for sensing an object image, transmission/reception means for transmitting/receiving data by radio, operation means for operating the image sensing means and the transmission/reception means, and switching means for switching the operation means between a state for operating the image sensing means, and a state for operating the transmission/reception means.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 6 is a flow chart showing the operation of the first embodiment;

FIG. 7 is a sequence chart of the first embodiment;

FIG. 8 is a front view showing a display example on a display in the first embodiment;

DETAILED DESCRIPTION OF THE PREFERRED EMBODIMENTS

The preferred embodiments of the present invention will be described in detail hereinafter with reference to the accompanying drawings.

First Embodiment

Figure 1:
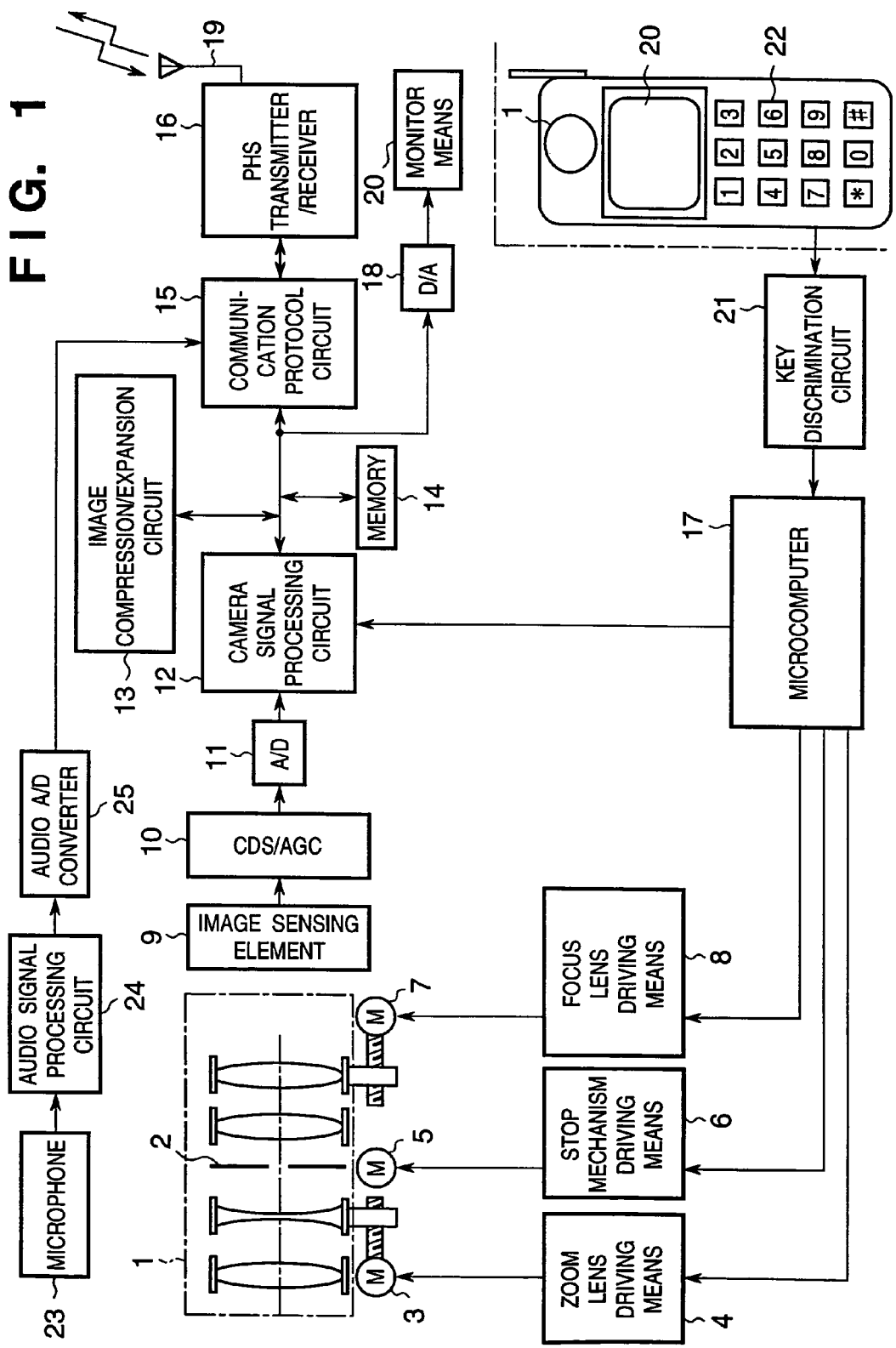
FIG. 1 is a block diagram showing a prior art.
Figure 2:
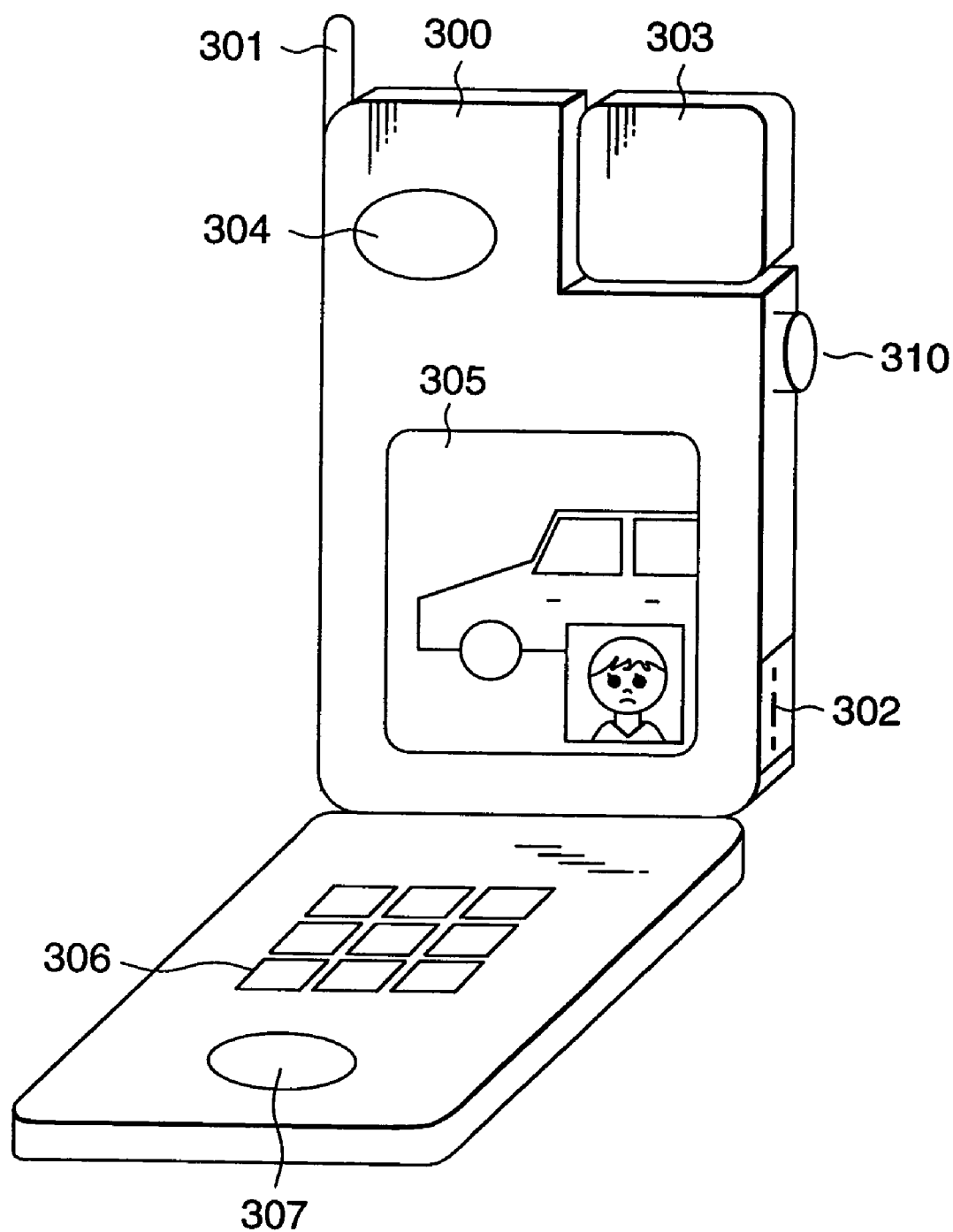
FIG. 2 is a front perspective view of the first embodiment of the present invention.

FIG. 2 is a front perspective view of a video camera with telephone according to the first embodiment of the present invention.

Referring to FIG. 2, reference numeral 300 denotes a video camera main body with telephone; 301, an antenna; 302, an external input/output terminal; 303, a camera; 304, a loudspeaker for outputting a received voice; 305, a display for outputting a received image or an image sensed by the video camera main body; 306, operation keys; 307, a microphone; and 310, a trigger switch.

Figure 3:
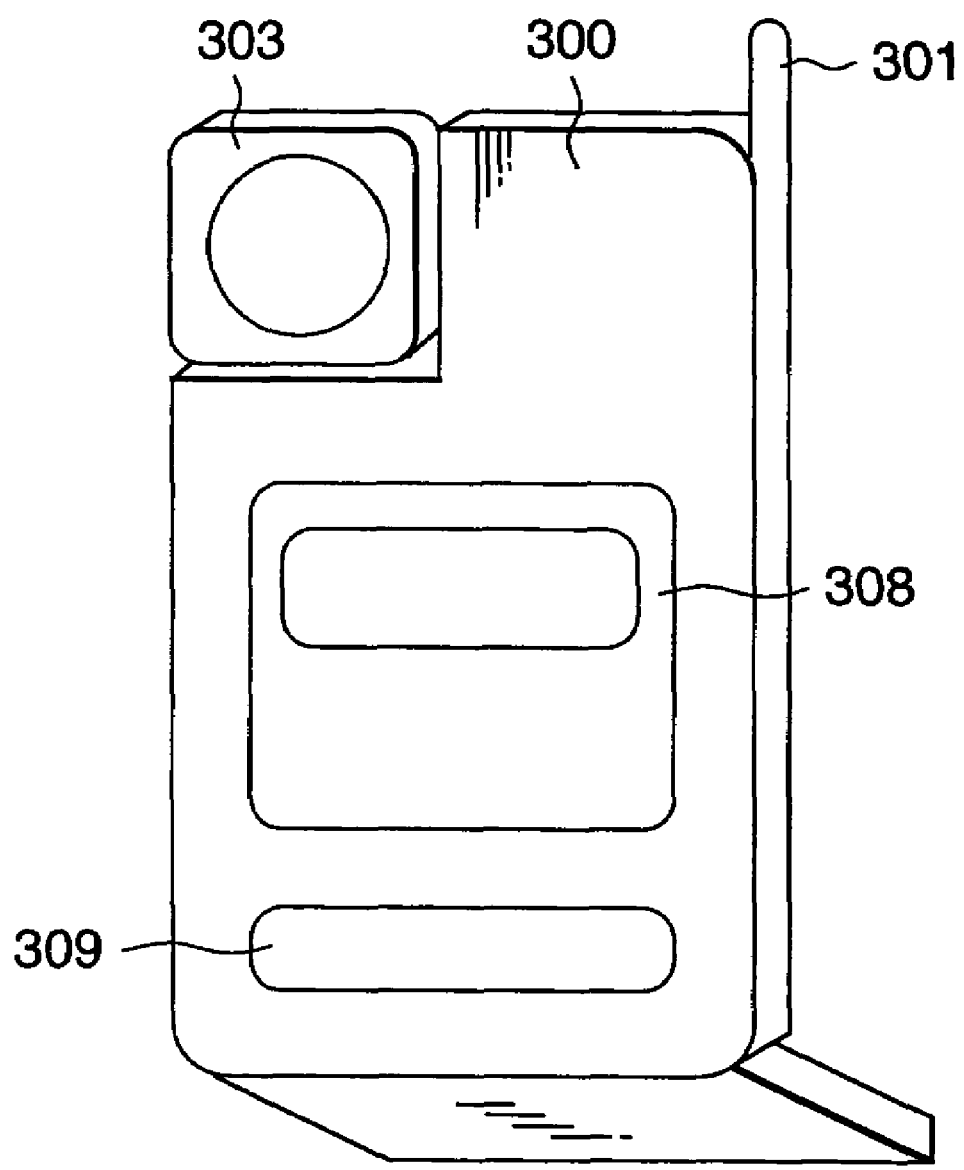
FIG. 3 is a rear perspective view of the first embodiment.

FIG. 3 is a rear perspective view of the video camera with telephone shown in FIG. 2. Referring to FIG. 3, reference numeral 308 denotes an insertion panel of a recording medium; and 309, an external power supply for the video camera main body with telephone.

In the video camera with telephone having the above arrangement, the operator inserts a recording medium into the recording medium insertion panel 308 upon sensing an image by the video camera, and records an image sensed by the camera 303, a voice picked up by the microphone 307, and various kinds of information such as image sensing information and the like on the recording medium. To access a radio public telephone network or a partner station, the operator operates the operation keys 306 to connect to a radio transmission path via the antenna 301 so as to establish connection with the partner station.

Upon establishing connection, video data sensed by the camera 303, audio data input by the microphone 307, and various kinds of information for control are transmitted as transmission information. Of received information, video information is displayed on the display 305, and audio information is output to the loudspeaker 304. Also, such received information can be recorded on the recording medium. The video camera with telephone may be remote-controlled by received control information.

Upon receiving a call by access from the radio public network or the partner station during image sensing by the operator, the video camera with telephone operates in accordance with a call reception mode and a video camera operation mode of the video camera main body 300 with telephone, which are set by the operator.

The video camera operation mode is selected from a-1: no mode change, and a-2: pause image recording. If a-1 is selected, no mode change is made; if a-2 is selected, the control enters an image recording pause mode. The call reception mode is selected from b-1: normal call reception, and b-2: image recording call reception. If b-1 is selected, normal call reception proceeds, i.e., an alerting bell, vibrator, LED, or the like functions; if b-2 is selected, image recording call reception proceeds, and the call reception function is stopped if it may disturb normal image recording. The call reception function that may disturb normal image recording includes sound produced by the alerting bell, vibration generated by the alerting vibrator, and a light source such as the call reception LED.

In case of image recording call reception, a call reception message is displayed on the display 305. At this time, the telephone number of the calling party, video information, importance level of the access purpose, subject matter, and the like are additionally displayed. Furthermore, as the video camera operation mode, other operation modes such as a stop mode, and the like, a mode of turning off the video camera unit, and the like may be added. Also, as the call reception mode, a call reception deny mode, transfer mode, automatic answering mode, and the like may be added. The display 305 can display an image sensed by the camera 303, and received information. Various kinds of information obtained can be input/output via the external input/output terminal 302. The video camera with telephone operates on the battery 309. The call reception mode and video camera operation mode are set using the operation keys 306. The recording medium is not particularly limited. For example, a magnetic tape, solid-state memory, and the like may be used.

Figure 4:
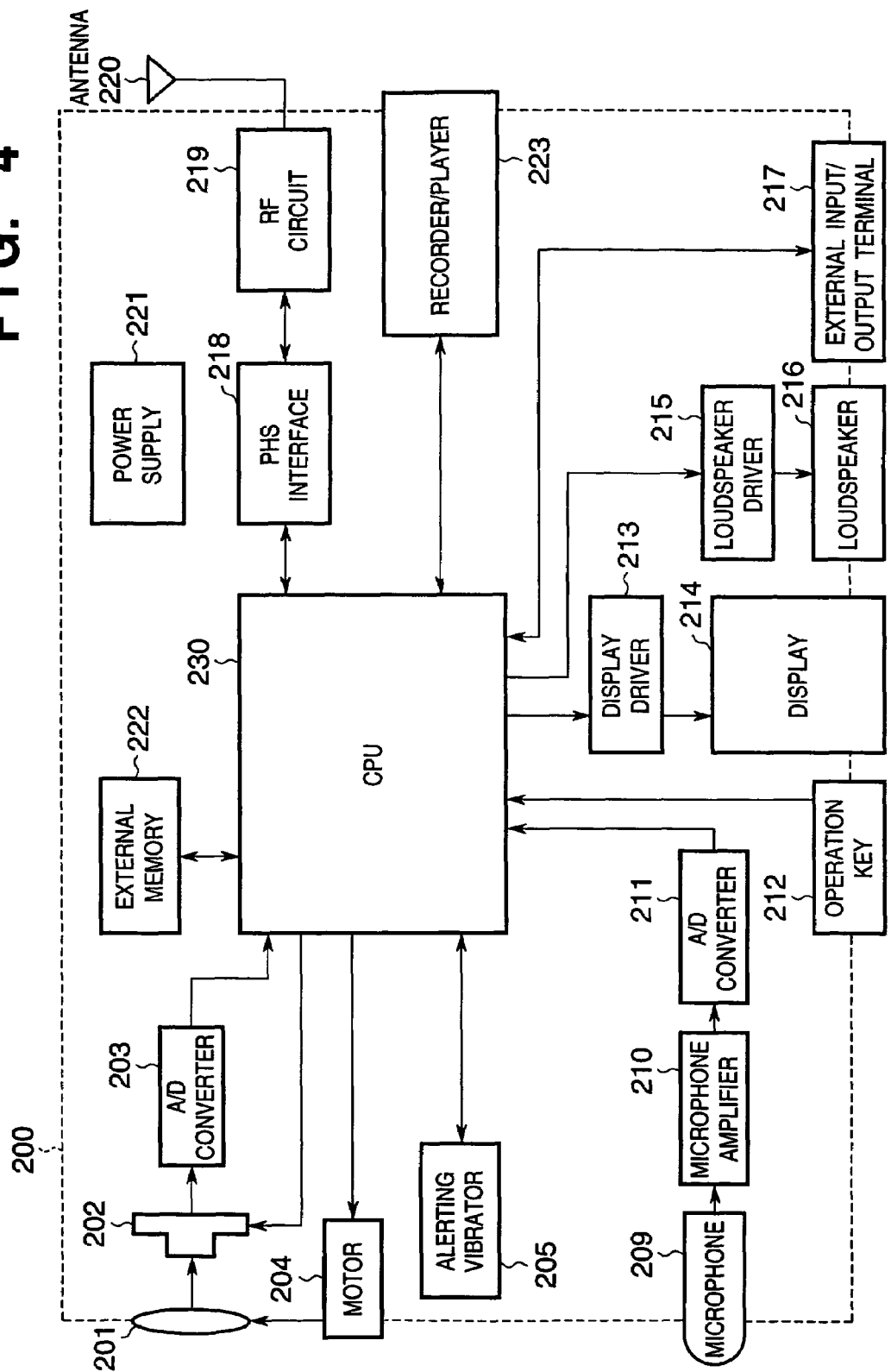
FIG. 4 is a block diagram of the first embodiment.

FIG. 4 is a block diagram of the video camera with telephone in the first embodiment.

Referring to FIG. 4, reference numeral 200 denotes the overall block of the video camera with telephone; 201, a lens for receiving an image; 202, a solid-state sensor for converting an image into an electrical signal; 203, an A/D converter for converting an analog signal into digital data; 204, a motor for driving the lens 201; 205, an alerting vibrator for informing the operator of reception of an incoming call; 209, a microphone for picking up a voice; 210, a microphone amplifier for amplifying an audio signal; 211, an A/D converter for converting an audio signal into digital data; 212, operation keys used for operating the video camera 200 with telephone; 213, a display driver for converting an image into a display format; 214, a display for displaying an image; 215, a loudspeaker driver for outputting an audio signal; 216, a loudspeaker; 217, an external input/output terminal for inputting/outputting various kinds of information; 218, a PHS interface for performing line control of, e.g., a PHS or the like; 219, an RF circuit for converting transmission data into radio data; 220, an antenna; 221, a power supply; 222, an external memory; 223, a recorder/player; and 230, a CPU for controlling the video camera system with telephone.

Figure 5:
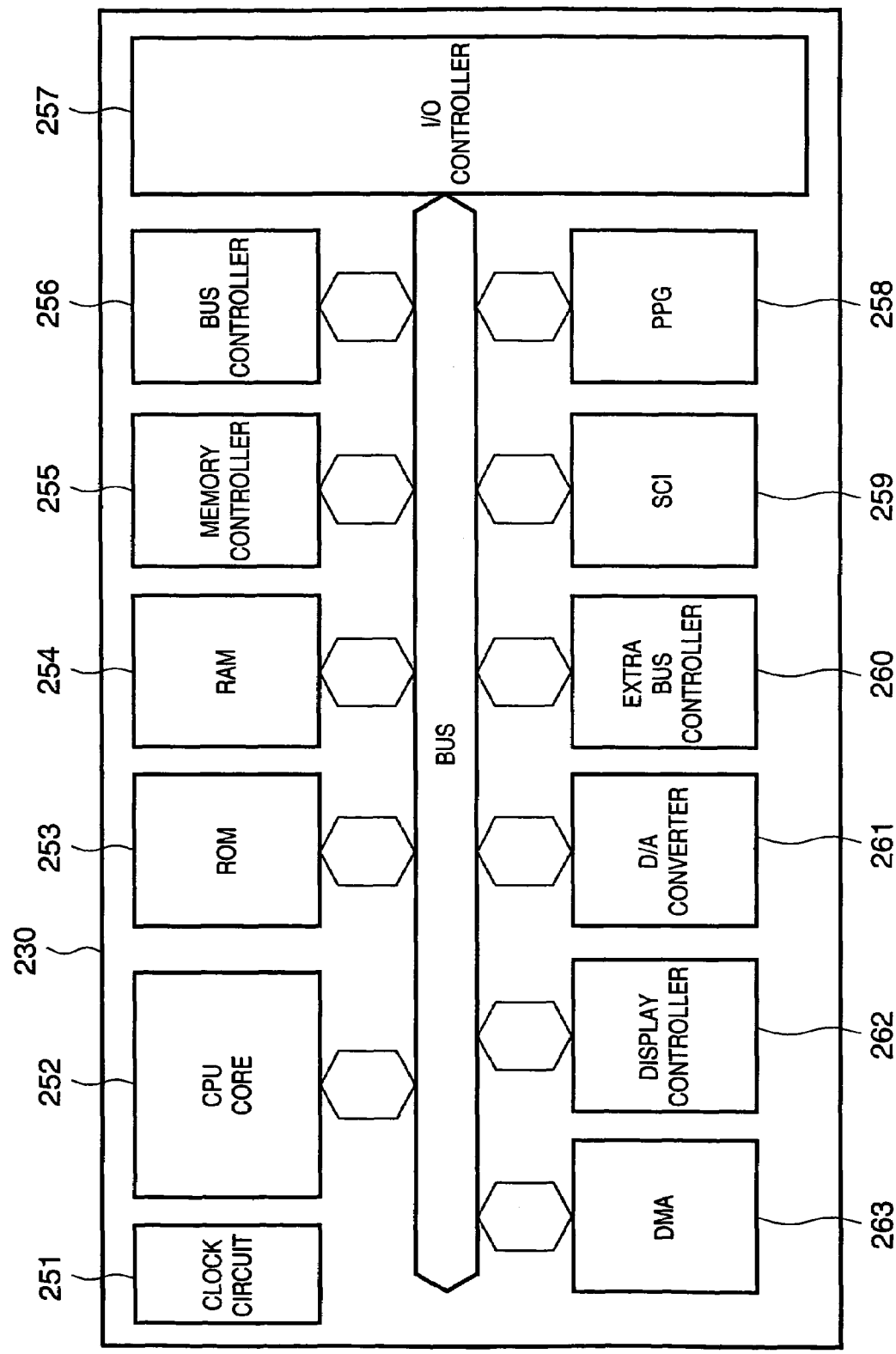
FIG. 5 is a block diagram of a CPU shown in FIG. 4.

FIG. 5 is a block diagram showing the CPU 230 in FIG. 4 in detail. Referring to FIG. 5, reference numeral 251 denotes a clock circuit for operating the CPU; 252, a CPU core; 253, a ROM for storing a program; 254, a RAM for storing data; 255, a memory controller for controlling an external memory and the like; 256, a bus controller for controlling a bus; 257, an I/O controller for interfacing external input/output; 258, a programmable pulse generator (PPG) for generating pulse data; 259, a serial communication interface (SCI) for controlling communications with an external device; 260, an extra bus controller for controlling communications with an external bus; 261, a D/A converter for converting digital data into analog data; 262, a display controller for controlling the display; and 263, a DMA for data transfer. The individual blocks are connected to each other via a data bus, address bus, and control bus.

In the block diagram shown in FIG. 4, incoming light from an object via the lens 201 is converted into an electrical signal by the solid-state sensor 202. The electrical signal is sampled by the A/D converter 203 to be converted into digital signal, and is input to the CPU 230 as a digital video signal. The lens 201 is driven by the motor 204 in accordance with a control command from the CPU 230 to attain an auto-focus function and zoom function.

A timing signal for reading data from the solid-state sensor 202 is generated by the CPU 230. An audio signal picked up by the microphone 209 is amplified by the microphone amplifier 210, and is sampled by the A/D converter 211 to be converted into digital data. The digital audio data is input to the CPU 230.

The digital video data undergoes basic processes such as color separation, white balance, gamma correction, aperture correction, and the like, and additional processes such as image size/image quality adjustment, position adjustment, and the like set using the operation keys 212 of the video camera 200 with telephone. Furthermore, the digital video data is compressed by a pre-set compression method and compression parameters to obtain compressed image data.

The audio data undergoes additional processes such as audio adjustment set using the operation keys 212 of the video camera 200 with telephone, and is compressed by the pre-set compression method and compression parameters to obtain compressed audio data.

The compressed image and audio data are re-formatted as radio transmission data, and are sent to the PHS interface 218 as transmission data together with control data. Also, the compressed image and audio data are sent to the recorder/player 223, and are recorded in an image recording mode. Furthermore, the compressed image and audio data are sent to the external input/output terminals 217 as needed. Moreover, the compressed image data is expanded as needed (in response to an operation of a corresponding one of the operation keys 212), and is displayed on the 214 via the display driver 213 as an image used for confirming transmission video data.

Data converted according to the radio protocol by the PHS interface 218 is modulated by the RF circuit 219, and the modulated data is transmitted from the antenna 220. On the other hand, radio data received at the antenna 220 is demodulated by the RF circuit 219, and is converted according to the radio protocol by the PHS interface 218 to obtain received data. The received data is sent to the CPU 230.

The received data is separated into received control data, received compressed audio data, and received compressed audio data, and the video camera 200 with telephone is controlled according to the received control data. The received compressed audio data is expanded and output to the loudspeaker 216 via the loudspeaker driver 215. The received compressed image data is expanded and output to the display 214 via the display driver 213.

The external memory 222 such as a DRAM, SRAM, or the like is used for the data process of the CPU 230. The external memory 222 can save a sensed image, received image, recorded voice, received voice, and the like. The power of the video camera 200 with telephone is supplied from the power supply 221. The alerting vibrator 205 vibrates to inform the user of reception of an incoming call upon receiving a call in the normal call reception mode.

The operation of the CPU 230 shown in the block diagram in FIG. 5 will be explained below.

The clock circuit 251 generates CPU driving clocks, and supplies them to peripheral circuits. In this embodiment, fundamental clocks of 27 MHz are multiplied 10-fold by a PLL to obtain driving clocks of 270 MHz for the CPU 230. The ROM 253 is a memory that stores program codes, and a program is executed by those codes. This memory may be replaced by a flash memory, EEPROM, or the like. The RAM 254 serves as a data memory for temporarily saving data.

The memory controller 255 is a circuit block for interfacing with an external memory, which is used for temporarily saving large-size data such as image data, audio data, and the like.

The display controller 262 is a circuit block for converting digital image data into output data to be sent to the display 214. The D/A converter 261 is used for, e.g., converting digital audio data into analog data.

The serial communication interface 259 makes serial data communications with external peripheral circuits, the PHS interface 218, and the like. The programmable pulse generator 258 generates driving pulses for the alerting vibrator, solid-state sensor, and motor. At this time, by arbitrarily setting the driving pulses for the solid-state sensor, various input conditions such as the size, the number of pixels, and the like of an input image can be arbitrarily set.

The I/O controller 257 serves as a data I/O interface, which inputs/outputs digital image data, digital audio data, operation key inputs, and other control signals. These blocks are connected via the bus, which is controlled by the bus controller 256, and transfers data under the control of the DMA 263. Also, the bus can be connected to an external bus via the extra bus controller 260. Using these peripheral circuits, the CPU core 252 executes data processes.

In this embodiment, the PHS is used for radio transmission. However, communication bands, methods, and the like are not particularly limited. For example, an analog radio telephone, W-CDMA, and the like may be used.

FIG. 6 shows some steps of the flow chart of the CPU 230. The flow starts in step S100, and it is checked in step S101 if an incoming call is detected. If NO in step S101, the flow jumps to step S110; otherwise, it is checked in step S102 if image recording is underway. If NO in step S102, the flow jumps to step S105; otherwise, the pre-set mode is checked in step S103. If "no mode change" is set, the flow jumps to step S105; if the image recording pause mode is set, the image recording mode is switched to the image recording pause mode in step S104. In step S105, the call reception mode is checked. If normal call reception is selected, the call reception informing function normally operates to inform the user of reception of an incoming call in step S107. On the other hand, if image recording call reception is selected, some call reception functions that may influence image recording are stopped, and a call reception message is displayed on the display in step S106. Then, the flow advances to step S110.

FIG. 7 is a sequence chart upon receiving a call. Upon reception of a connection request from the calling party, the video camera issues a connection standby command to the calling party depending on the pre-set operation mode of the video camera. The video camera changes the mode or displays a call reception message if required depending on the pre-set contents of the call reception mode and video camera operation mode, and the current video camera operation mode, and issues a connection completion command. Then, normal connection proceeds in response to a connection completion acknowledge message from the calling party.

FIG. 8 shows a display example on the display 214 in this embodiment. A screen 600 displays an image which is being recorded, and a window 601 shows information of the calling party. More specifically, the window 601 displays various kinds of information, i.e., "call reception" indicating that an incoming call is received, "important" indicating the importance level of a connection request, "meeting" indicating subject matter, and the face image of the calling party. Those information contents are displayed based on information appended to the connection request from the calling party.

According to this embodiment, image recording can be satisfactorily done without being influenced by an unexpected call. In accordance with the pre-set modes, the operator can be appropriately informed of reception of an incoming call. Also, the operator can be adequately informed of the information contents.

To restate, according to this embodiment, since the operator is adequately informed of reception of an incoming call in accordance with the operation mode of the video camera at the time of call reception, the telephone function and video camera function can be appropriately combined. Hence, a video camera with telephone having high operability can be provided.

Second Embodiment

Figure 9:
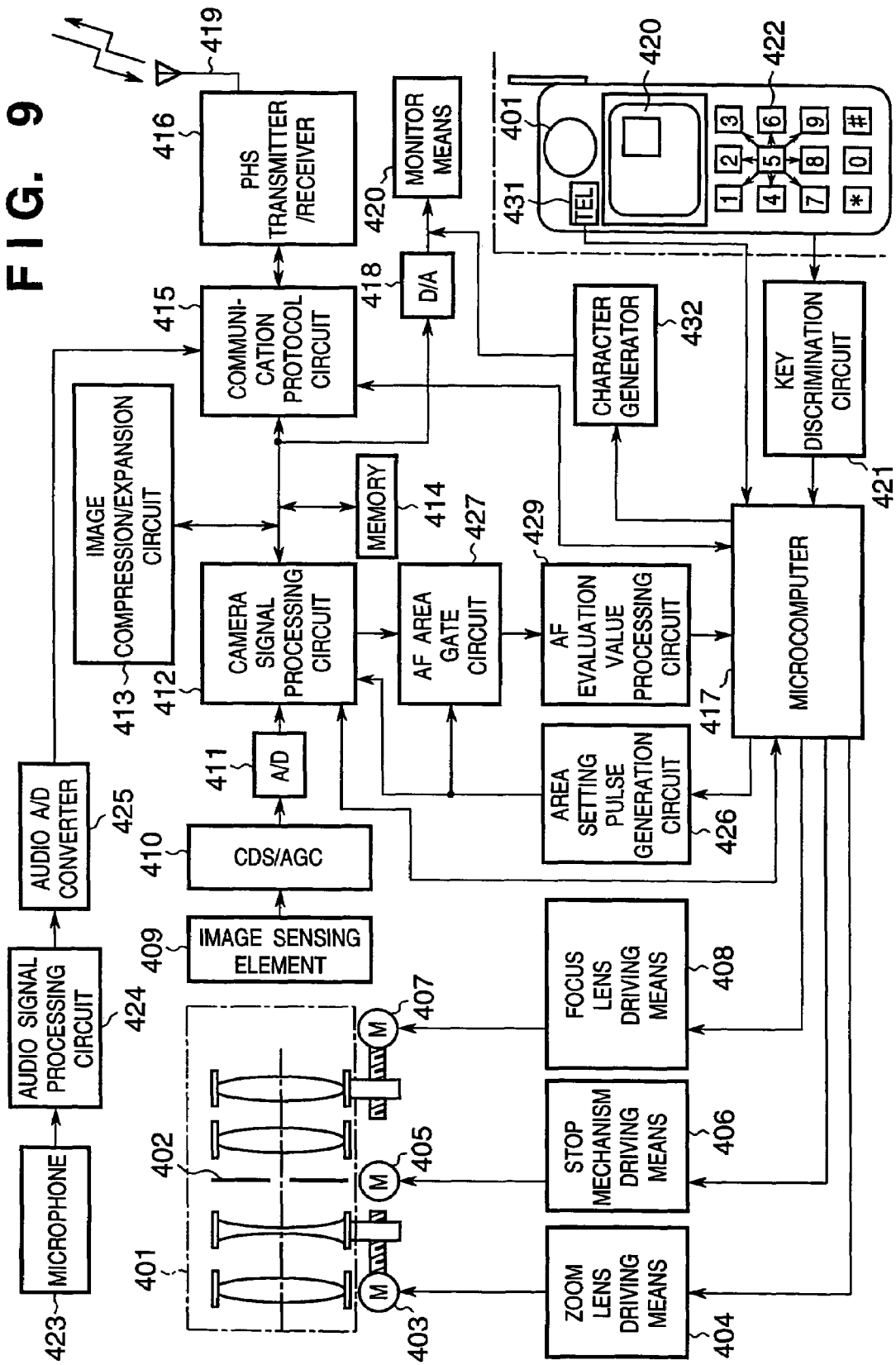
FIG. 9 is a block diagram of an image communication apparatus according to the second embodiment of the present invention.

FIG. 9 is a block diagram showing the arrangement of an image communication apparatus according to the second embodiment of the present invention.

Referring to FIG. 9, reference numeral 401 denotes a lens; 402, a stop of the lens; 403, a motor for driving a zoom lens; 404, a driving means for driving the zoom lens; 405, a motor for driving the stop; 406, a driving means for driving a stop mechanism; 407, a motor for driving a focus lens; and 408, a driving means for driving the focus lens.

Reference numeral 409 denotes an image sensing element (CCD); 410, a CDS/AGC circuit for sampling & holding a video signal output from the image sensing element, and performing AGC (auto gain control) of the video signal; 411, an A/D converter for converting an analog signal into a digital signal; 412, a camera signal processing circuit for processing luminance and color signals to obtain an appropriate video signal; and 413, an image compression/expansion circuit for compressing/expanding an image. The image compression/expansion circuit 413 uses, for example, JPEG, H263, a DV format, or the like.

Reference numeral 414 denotes a memory; 415, a communication protocol circuit; 416, a PHS transmitter/receiver; 417, a microcomputer; 418, a D/A converter for converting a digital signal into an analog signal; 419, an antenna; 420, a monitor (or a liquid crystal display device); 421, a key discrimination circuit; and 422, a ten-key pad for inputting a telephone number.

Reference numeral 423 denotes a microphone; 424, an audio signal processing circuit for processing an audio signal input from the microphone to obtain an appropriate signal; 425, an A/D converter for converting an analog audio signal into a digital signal; 426, an area setting pulse generation circuit; 427, a gate circuit for setting an AF (auto-focus) area; and 429, an AF evaluation value processing circuit. Reference numeral 431 denotes a telephone/camera mode selection switch; and 432, a character generator.

The operation of the above arrangement will be explained below.

Incoming light from an object via the lens 401 is photoelectrically converted into an electrical signal by the image sensing element 409. The electrical signal is processed by the camera signal processing circuit 412 to obtain a video signal. Furthermore, the video data is compressed by the image compression/expansion circuit 413, and the compressed data is stored in the memory 414.

The data compressed by the image compression/expansion circuit 413 is processed by the communication protocol circuit 415 to obtain data according to a prescribed communication rule, and the processed data is transmitted from the antenna 419 via the PHS transmitter/receiver 416. The data output from the camera signal processing circuit 412 is converted into an analog signal by the D/A converter 418, and the analog signal is processed to be displayed on the monitor. After that, an image is output to the monitor.

Moreover, image and audio radio signals transmitted from an external device are received by the PHS transmitter/receiver 416 via the antenna 419, and image and audio data are obtained via the communication protocol circuit 415. After that, the image data is expanded by the image compression/expansion circuit 413, and is output to the monitor via the D/A converter 418.

The microcomputer 417 controls the system of this apparatus, and performs various kinds of lens control (control of the focus lens, zoom lens, and stop), camera signal processing control, communication control, key control, and the like.

The ten-key pad 422 is used for inputting the telephone number of the called party upon placing a call, and the discrimination circuit 421 discriminates the input key. The output from the discrimination circuit 421 is input to the microcomputer 417, which executes a series of control processes for initiating a call.

The same applies to an audio signal. That is, after a voice is input from the microphone 423, the audio signal is processed by the audio signal processing circuit 424, and is input to the communication protocol circuit 415 via the audio A/D converter 425. After that, the audio signal is transmitted as a radio signal from the antenna 419 via the PHS transmitter/receiver as in the video signal.

The characteristic feature of this embodiment will be explained below.

An auto-focus signal is output from the camera signal processing circuit 412, and an image signal is gated based on arbitrarily set area setting pulses output from the area setting pulse generation circuit 426 in the AF gate circuit 427. More specifically, this block can designate an object to be focused on the screen. After that, the AF evaluation value processing circuit 429 appropriately processes the auto-focus signal, and outputs the processed signal to the microcomputer 417. The microcomputer 417 outputs a signal for driving the lens to adjust the focus on the object to be focused. The timings of pulses generated by the area setting pulse generation circuit 426 are set by the ten-key pad 422 (#0 to #9). The ten-key pad 422 is also used for inputting a telephone number, and is one of the characteristic features of this embodiment.

The operations and arrangement of the ten-key pad will be explained below. The ten-key pad 422 can be used in two modes by the telephone/camera mode selection switch 413, as shown in FIG. 10.

Figure 10:
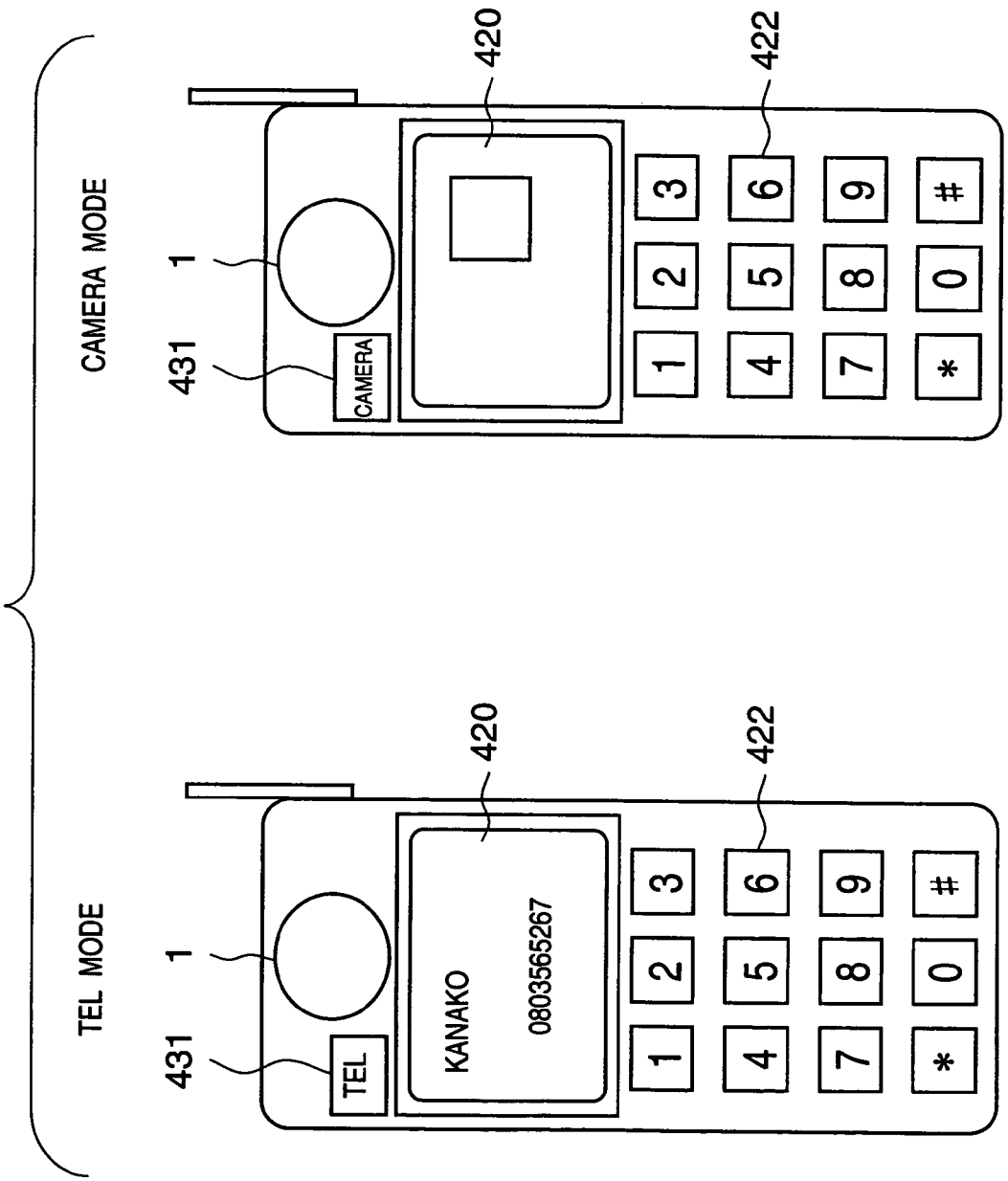
FIG. 10 shows the layout of operation switches.

When the user sets the telephone mode using the telephone/camera mode selection switch 431 to make a call, the ten-key pad 422 serves as keys used for inputting a telephone number, as in the telephone mode shown in FIG. 10. More specifically, when the user inputs a telephone number using the ten-key pad 422, the microcomputer 417 recognizes the telephone number via the key discrimination circuit 421, and supplies a signal to the communication protocol circuit 415 to call a person corresponding to the input telephone number. After that, a call is placed to the person corresponding to the input telephone number from the antenna 419 via the PHS transmitter/receiver 416.

On the other hand, when the telephone/camera mode selection switch 431 is switched to the camera mode, the ten-key pad 422 serves as keys for inputting an AF (auto-focus) set area, as shown in FIG. 10. For example, when the user wants to set an area from the center toward the upper right corner, as shown in FIG. 10, he or she pushes key #3 of the ten-key pad 422, and the key discrimination circuit 421 converts that input into a signal for discriminating that key #3 has been pressed. The microcomputer 417 processes data to set an upper right area, and sends that data to the area setting pulse generation circuit 426, which generates pulses corresponding to the position of the received data.

After that, the AF area gate circuit 427 gates an image signal on the basis of those pulses, i.e., passes only a focus signal within the set area. The AF evaluation value processing circuit 429 processes the focus signal to attain in-focus, and inputs the processed signal to the microcomputer 417, which outputs data for driving the lens to adjust a focus. The focus lens driving circuit 408 drives the lens based on the received data. In this way, an object within the set area can be focused. The microcomputer 417 inputs area setting data to the character generator 432, which generates an area setting frame to be displayed on a display circuit, and displays the frame on the monitor 420.

Likewise, to move the area setting frame around #5 as the center, the user pushes key #1 (upper left), #2 (upper), #3 (upper right) #4 (left), #5 (preset at the center), #6 (right), #7 (lower left), #8 (lower), or #9 (lower right) to adjust the focus on an object within the set area he or she selected, on the basis of the same operation principle as mentioned above. The monitor 420 displays the area setting frame at that time.

As described above, according to this embodiment, since a common switch can efficiently provide two functions, the design of a compact portable device can be prevented from being impaired and its size can be prevented from increasing.

Third Embodiment

Figure 11:
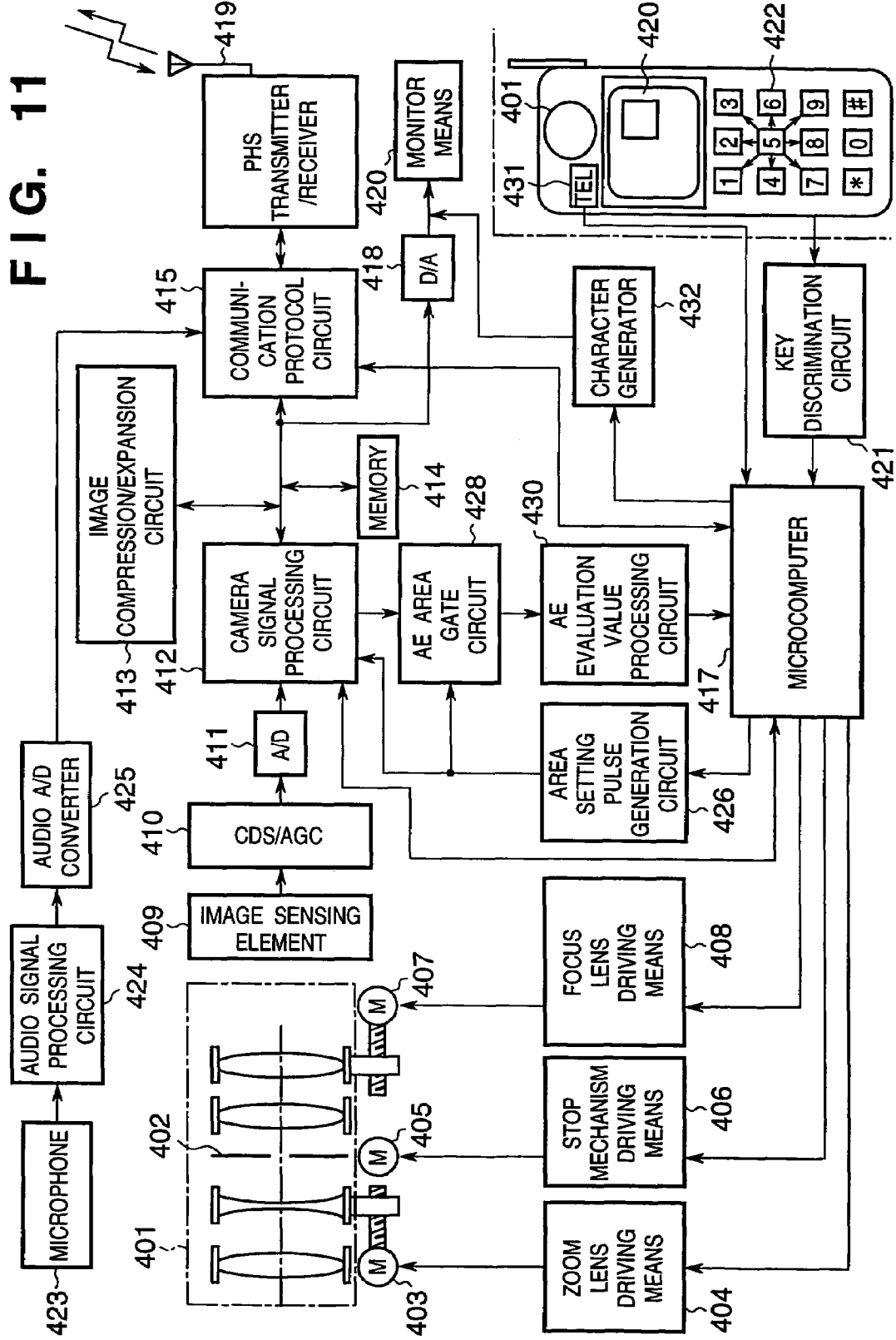
FIG. 11 is a block diagram of an image communication apparatus according to the third embodiment of the present invention.

FIG. 11 is a block diagram showing the arrangement of an image communication apparatus according to the third embodiment of the present invention. The same reference numerals in the third embodiment shown in FIG. 11 denote the same parts as those in the second embodiment shown in FIG. 9, and a detailed description thereof will be omitted.

Referring to FIG. 11; reference numeral 428 denotes an AE area gate circuit; and 430, an AE evaluation value processing circuit.

The characteristic feature of this embodiment will be explained below.

An image exposure signal is output from the camera signal processing circuit 412, and an image signal is gated based on arbitrarily set area setting pulses output from the area setting pulse generation circuit 426 in the AE gate circuit 428. More specifically, this block can designate an object to be adjusted to have optimal exposure state on the screen. After that, the AE evaluation value processing circuit 430 appropriately processes the signal for obtaining an optimal exposure value, and outputs the processed signal to the microcomputer 417.

The microcomputer 417 outputs a signal for driving the stop so that the selected object has an optimal exposure value. The timings of pulses generated by the area setting pulse generation circuit 426 are set by the ten-key pad 422 (#0 to #9). The ten-key pad 422 is also used for inputting a telephone number, and is one of the characteristic features of this embodiment.

The operations and arrangement of the ten-key pad will be explained below. The ten-key pad 422 can be used in two modes, as shown in FIG. 10.

When the user sets the telephone mode using the telephone/camera mode selection switch 431 to make a call, the ten-key pad 422 serves as keys used for inputting a telephone number, as in the telephone mode shown in FIG. 10. More specifically, when the user inputs a telephone number using the ten-key pad 422, the microcomputer 417 recognizes the telephone number via the key discrimination circuit 421, and supplies a signal to the communication protocol circuit 415 to call a person corresponding to the input telephone number. After that, a call is placed to the person corresponding to the input telephone number from the antenna 419 via the PHS transmitter/receiver 416.

On the other hand, when the telephone/camera mode selection switch 431 is switched to the camera mode, the ten-key pad 422 serves as keys for inputting an AE (auto-iris) set area, as shown in FIG. 10. For example, when the user wants to set an area from the center toward the upper right corner, as shown in FIG. 10, he or she pushes key #3 of the ten-key pad 422, and the key discrimination circuit 421 converts that input into a signal for discriminating that key #3 has been pressed. The microcomputer 417 processes data to set an upper right area, and sends that data to the area setting pulse generation circuit 426, which generates pulses corresponding to the position of the received data. After that, the AE area gate circuit 428 gates an image signal on the basis of those pulses, i.e., passes only an exposure signal within the set area. The AE evaluation value processing circuit 430 processes the exposure signal to obtain an optimal exposure value, and inputs the processed signal to the microcomputer 417, which outputs data for driving the stop to obtain an optimal exposure value. The stop mechanism driving means 406 drives the stop 402 based on the received data. In this way, an optimal exposure value can be obtained with respect to an object within the set area. The microcomputer 417 inputs area setting data to the character generator 432, which generates an area setting frame to be displayed on a display circuit, and displays the frame on the monitor 420.

Likewise, to move the area setting frame around #5 as the center, the user pushes key #1 (upper left), #2 (upper), #3 (upper right) #4 (left), #5 (preset at the center), #6 (right), #7 (lower left), #8 (lower), or #9 (lower right) to obtain an optimal exposure value for an object within the set area he or she selected, on the basis of the same operation principle as mentioned above. The monitor 420 displays the area setting frame at that time.

As described above, according to this embodiment, since a common switch can efficiently provide two functions, the design of a compact portable device can be prevented from being impaired and its size can be prevented from increasing.

Fourth Embodiment

Figure 12:
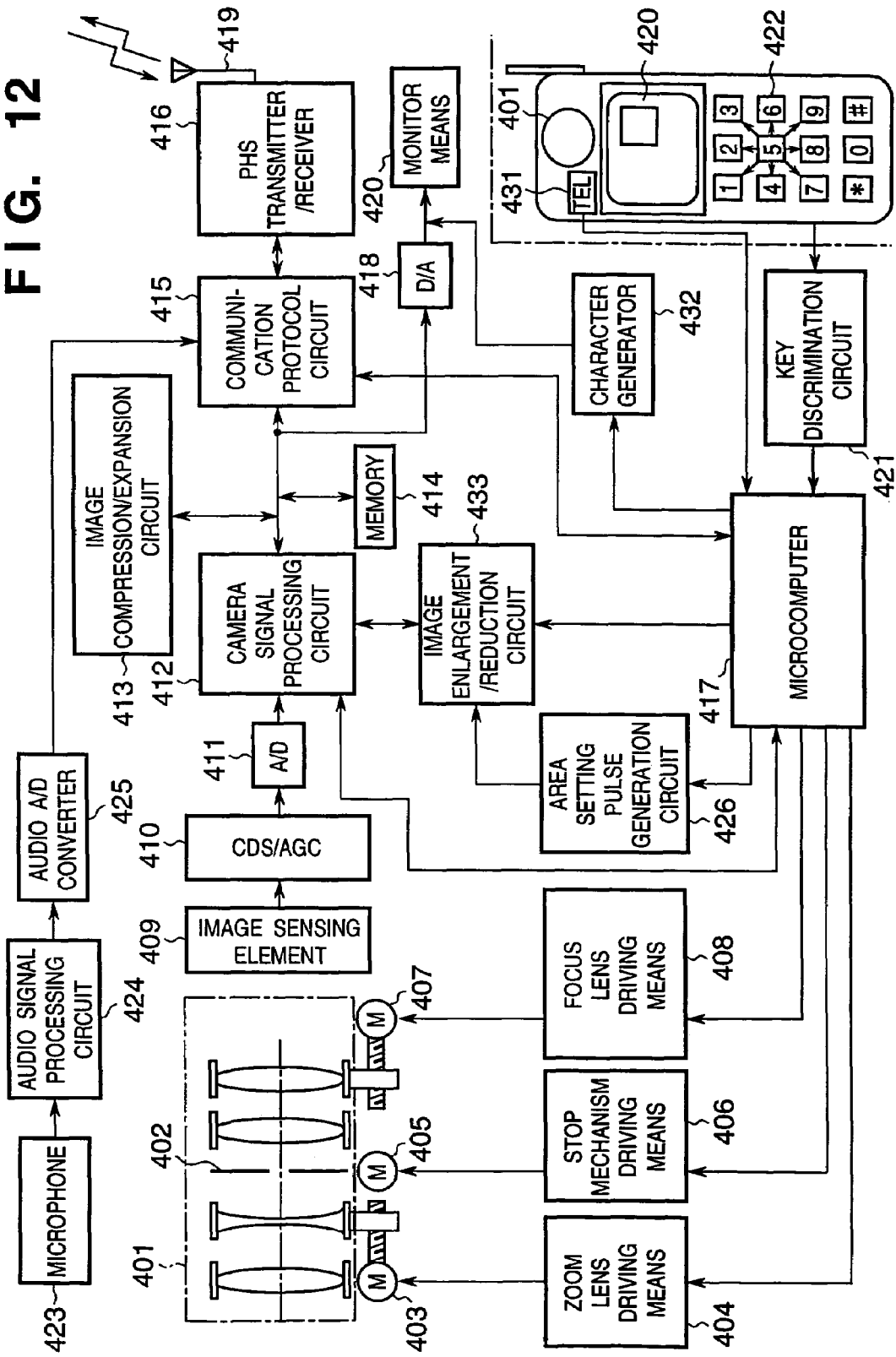
FIG. 12 is a block diagram of an image communication apparatus according to the fourth embodiment of the present invention.

FIG. 12 is a block diagram showing the arrangement of an image communication apparatus according to the fourth embodiment of the present invention. The same reference numerals in the fourth embodiment shown in FIG. 12 denote the same parts as those in the second embodiment shown in FIG. 9, and a detailed description thereof will be omitted.

Referring to FIG. 12, reference numeral 433 denotes an image enlargement/reduction circuit.

The characteristic feature of this embodiment will be explained below.

An image signal is output from the camera signal processing circuit 412, and the image enlargement/reduction circuit 433 electronically enlarges an image within a set area on the basis of area setting data output from the area setting pulse generation circuit 426.

The enlarged image is displayed on a display circuit via the camera signal processing circuit 412 and D/A converter 418.

The timings of pulses generated by the area setting pulse generation circuit 426 are set by the ten-key pad 422 (#0 to #9). The ten-key pad 422 is also used for inputting a telephone number, and is one of the characteristic features of this embodiment.

The operations and arrangement of the ten-key pad will be explained below. The ten-key pad 422 can be used in two modes, as shown in FIG. 10.

When the user sets the telephone mode using the telephone/camera mode selection switch 431 to make a call, the ten-key pad 422 serves as keys used for inputting a telephone number, as in the telephone mode shown in FIG. 10. More specifically, when the user inputs a telephone number using the ten-key pad 422, the microcomputer 417 recognizes the telephone number via the key discrimination circuit 421, and supplies a signal to the communication protocol circuit 415 to call a person corresponding to the input telephone number. After that, a call is placed to the person corresponding to the input telephone number from the antenna 419 via the PHS transmitter/receiver 416.

On the other hand, when the telephone/camera mode selection switch 431 is switched to the camera mode, the ten-key pad 422 serves as keys for arbitrarily inputting an area to be enlarged on the screen by the user, as shown in the camera mode of FIG. 10.

For example, when the user wants to enlarge an upper right object, as shown in FIG. 10, he or she pushes key #3 of the ten-key pad 422, and the key discrimination circuit 421 converts that input into a signal for discriminating that key #3 has been pressed. The microcomputer 417 processes data to set an upper right area, and sends that data to the area setting pulse generation circuit 426, which generates pulses corresponding to the position of the received data. After that, the image enlargement/reduction circuit 433 electronically enlarges an image within the area of that data. The enlarged image is displayed on the display circuit via the camera signal processing circuit 412 and D/A converter 418.

The microcomputer 417 inputs area setting data to the character generator 432, which generates an area setting frame to be displayed on the display circuit, and displays the frame on the monitor 420. Likewise, to move the area setting frame around #5 as the center, the user pushes key #1 (upper left), #2 (upper), #3 (upper right) #4 (left), #5 (preset at the center), #6 (right), #7 (lower left), #8 (lower), or #9 (lower right) to an area for an object to be enlarged, and the object within that area can be displayed as an enlarged image, on the basis of the same operation principle as mentioned above. Also, the set frame is displayed on the monitor 420.

Also, reduction is done based on the same operation principle as in enlargement.

Fifth Embodiment

Figure 13:
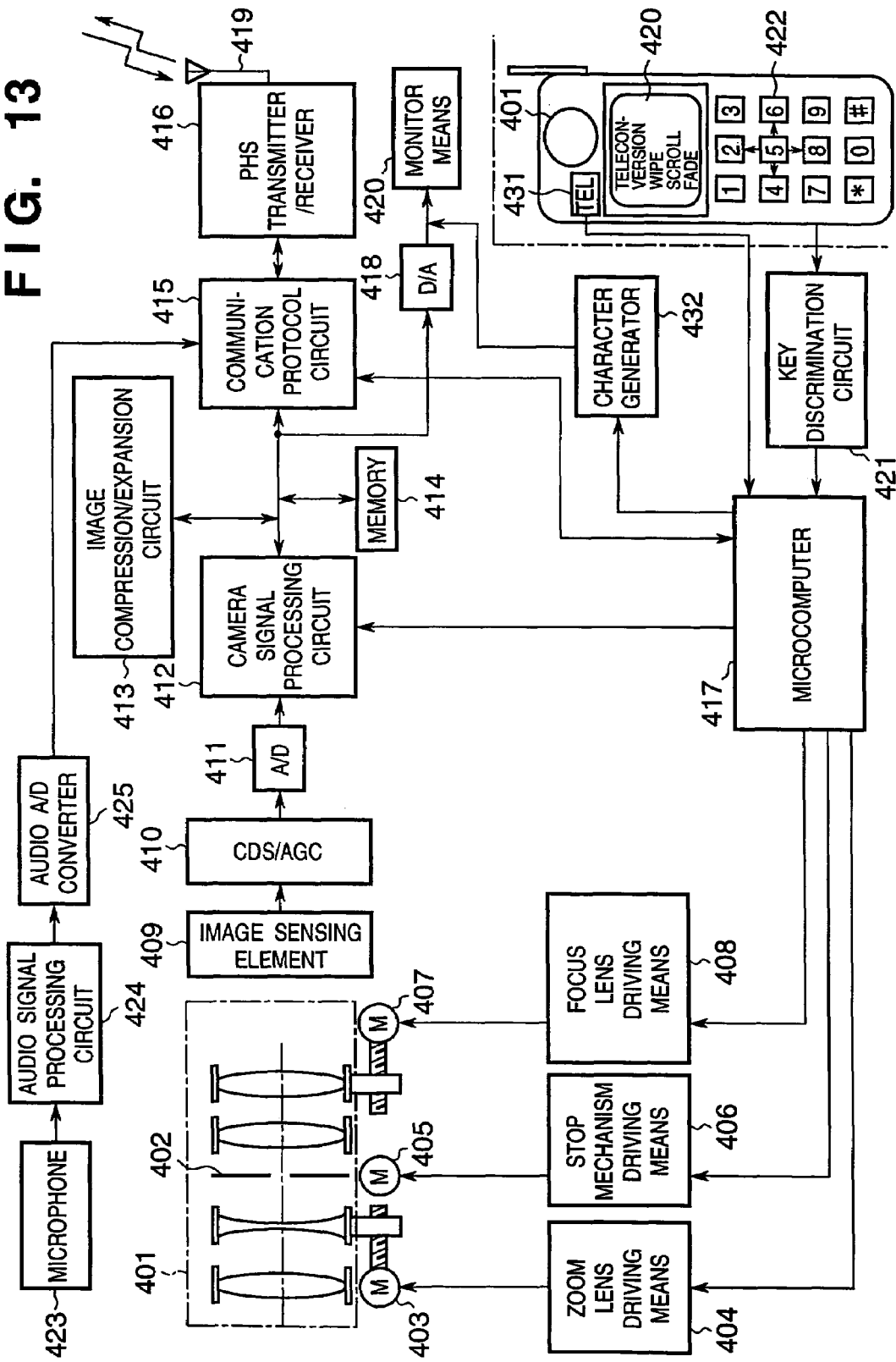
FIG. 13 is a block diagram of an image communication apparatus according to the fifth embodiment of the present invention.

FIG. 13 is a block diagram showing the arrangement of an image communication apparatus according to the fifth embodiment of the present invention. The same reference numerals in the fifth embodiment shown in FIG. 13 denote the same parts as those in the second embodiment shown in FIG. 9, and a detailed description thereof will be omitted.

The characteristic feature of this embodiment will be explained below.

The microcomputer 417 controls a plurality of functions. For example, the microcomputer 417 controls white balance set, shutter, and fade as camera functions, and teleconversion, wipe, scroll, and the like as digital effect functions, and executes a function selected by external operation. As a method of allowing the user to easily operate such multiple functions, menu setup is available. This embodiment is directed to improving the functions of operation switches to attain menu setups, and will be explained in detail with reference to FIGS. 13 and 14.

Figure 14:
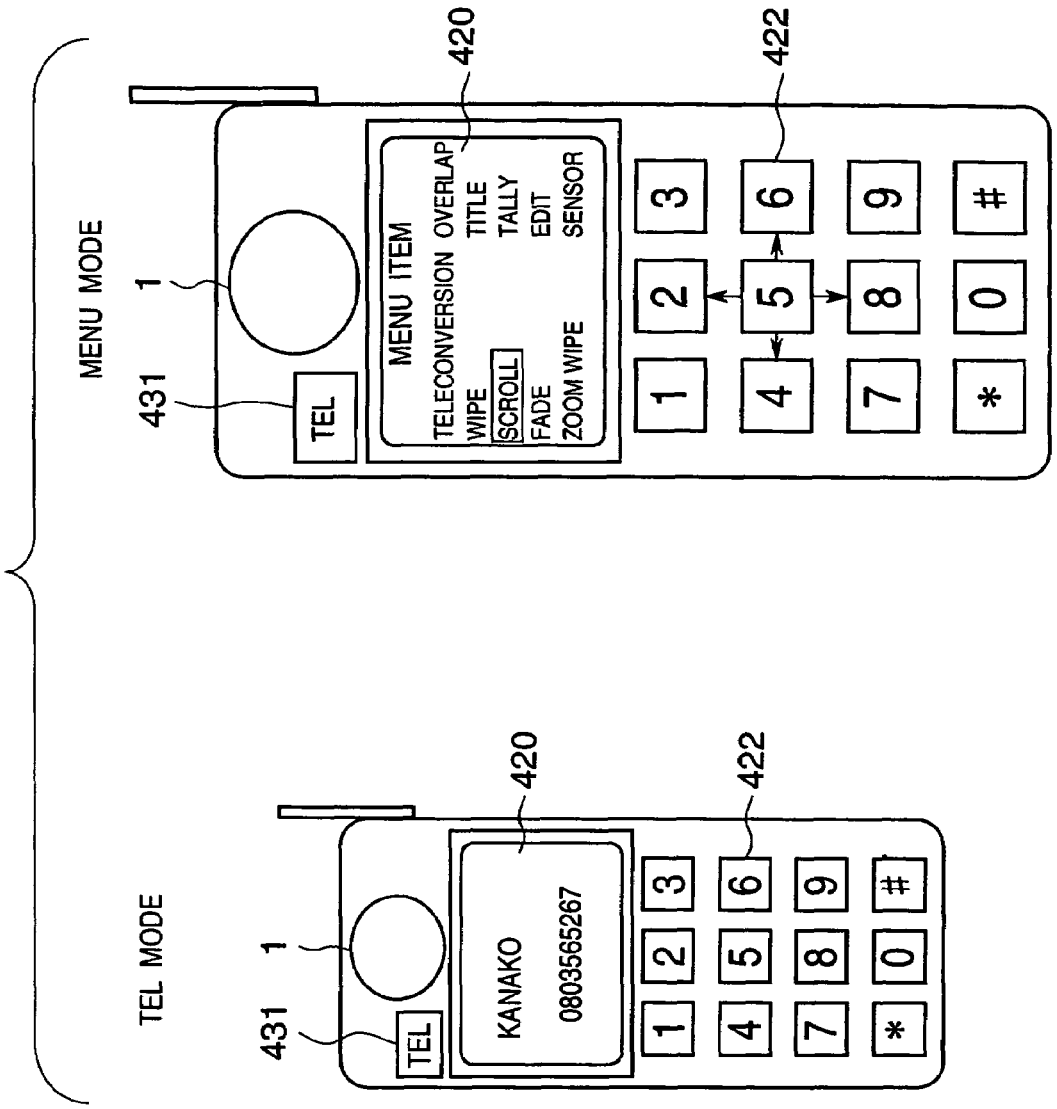
FIG. 14 shows the layout of operation keys in the fifth embodiment.

The ten-key pad 422 can be used in two modes by a telephone/menu mode selection switch 431, as shown in FIG. 14.

When the user sets the telephone mode using the telephone/menu mode selection switch 431 to make a call, the ten-key pad 422 serves as keys used for inputting a telephone number, as in the telephone mode shown in FIG. 14. More specifically, when the user inputs a telephone number using the ten-key pad 422, the microcomputer 417 recognizes the telephone number via the key discrimination circuit 421, and supplies a signal to the communication protocol circuit 415 to call a person corresponding to the input telephone number. After that, a call is placed to the person corresponding to the input telephone number from the antenna 419 via the PHS transmitter/receiver 416.

On the other hand, when the telephone/menu mode selection switch 431 is switched to the menu mode, a plurality of functions available are displayed on the screen, and the user selects a function to be executed using the ten-key pad 422, as shown in the menu mode of FIG. 14.

For example, when the user wants to execute "title", and if the cursor is currently located at "scroll", the user pushes key #6 of the menu-key pad (ten-key pad) 422, and then pushes key #2 to select "title". That is, the user can move the cursor upward, leftward, downward, and rightward by pushing keys #2, #4, #8, and #6 of the ten-key pad 422 to select a function he or she wants to designate. At this time, when the user pushes a given key on the ten-key pad 422, data of the selected item is input from the microcomputer 417 to the character generator 432 via the key discrimination circuit 421, and the character generator 432 generates display data to be displayed on the display circuit, thus making a display on the monitor 420.

More specifically, the user can select and execute a desired function while observing displayed menu items, and switches are easy to operate since they have the same layout as that of menu items displayed. Since common switches are efficiently and selectively used in the TEL and menu modes, such arrangement is very effective for a portable device which must attain a size reduction.

As described above, according to the second to fifth embodiments, in a portable device which has camera and communication functions like a videophone, a compact image communication apparatus which has a function of allowing the user to adjust the focus on an arbitrary object to be sensed on the screen, and can provide many functions without increasing the number of switches and impairing design, can be provided.

Also, a low-cost image communication apparatus which is easy to operate since it adopts an efficient switch layout can be provided.

Furthermore, a compact image communication apparatus which has a function of allowing the user to obtain an optimal exposure value on an arbitrary object to be sensed on the screen, and can provide many functions without increasing the number of switches and impairing design, can be provided.

Moreover, a compact image communication apparatus which has a function of allowing the user to enlarge or reduce an arbitrary object to be sensed on the screen, and can provide many functions without increasing the number of switches and impairing design, can be provided.

In addition, a compact image communication apparatus which allows the user to select and execute a function while observing menu items displayed, is easy to operate since switches and displayed items have a common layout, and can provide many functions without increasing the number of switches and impairing design, can be provided.

To restate, according to the second to fifth embodiments, a low-cost image communication apparatus, which is easy to operate since it adopts an efficient switch layout, while providing many functions, can be provided.

Sixth Embodiment

Figure 15:
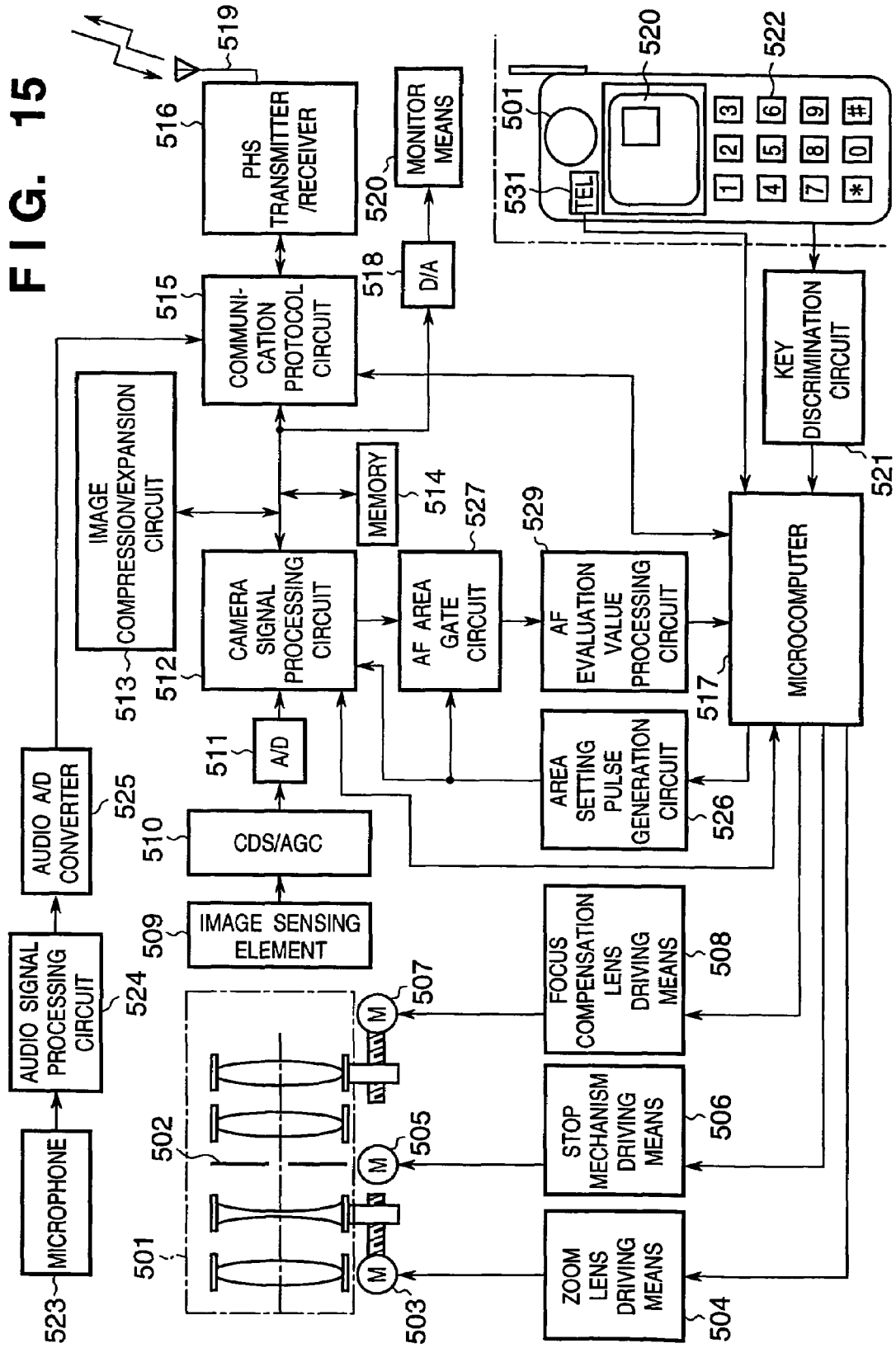
FIG. 15 is a block diagram of an image communication apparatus according to the sixth embodiment of the present invention.

FIG. 15 is a block diagram showing the arrangement of an image communication apparatus according to the sixth embodiment of the present invention.

Referring to FIG. 15, reference numeral 501 denotes a lens; 502, a stop of the lens; 503, a motor for driving a zoom lens; 504, a driving means for driving the zoom lens; 505, a motor for driving the stop; 506, a driving means for driving a stop mechanism; 507, a motor for driving a focus lens; and 508, a driving means for driving the focus lens.

Reference numeral 509 denotes an image sensing element (CCD); 510, a CDS/AGC circuit for sampling & holding a video signal output from the image sensing element, and performing AGC (auto gain control) of the video signal; 511, an A/D converter for converting an analog signal into a digital signal; 512, a camera signal processing circuit for processing luminance and color signals to obtain an appropriate video signal; and 513, an image compression/expansion circuit for compressing/expanding an image. The image compression/expansion circuit 513 uses, for example, JPEG, H263, a DV format, or the like.

Reference numeral 514 denotes a memory; 515, a communication protocol circuit; 516, a PHS transmitter/receiver; 517, a microcomputer; 518, a D/A converter for converting a digital signal into an analog signal; 519, an antenna; 520, a monitor (or a liquid crystal display device); 521, a key discrimination circuit; and 522, a ten-key pad for inputting a telephone number.

Reference numeral 523 denotes a microphone; 524, an audio signal processing circuit for processing an audio signal input from the microphone to obtain an appropriate signal; 525, an A/D converter for converting an analog audio signal into a digital signal; 526, an area setting pulse generation circuit; 527, a gate circuit for setting an AF (auto-focus) area; 529, an AF evaluation value processing circuit; and 531, a selection switch for selecting a telephone function upon placing a call.

The operation of the above arrangement will be explained below.

Incoming light from an object via the lens 501 is photoelectrically converted into an electrical signal by the image sensing element 509. The electrical signal is processed by the camera signal processing circuit 512 to obtain a video signal. Furthermore, the video data is compressed by the image compression/expansion circuit 513, and the compressed data is stored in the memory 514.

The data compressed by the image compression/expansion circuit 513 is processed by the communication protocol circuit 515 to obtain data according to a prescribed communication protocol, and the processed data is transmitted from the antenna 519 via the PHS transmitter/receiver 516. The data output from the camera signal processing circuit 512 is converted into an analog signal by the D/A converter 518, and the analog signal is processed to be displayed on the monitor. After that, an image is output to the monitor.

Moreover, image and audio radio signals transmitted from an external device are received by the PHS transmitter/receiver 516 via the antenna 519, and image and audio data are obtained via the communication protocol circuit 515. After that, the image data is expanded by the image compression/expansion circuit 513, and is output to the monitor via the D/A converter 518.

The microcomputer 517 controls the system of this apparatus, and performs various kinds of lens control (control of the focus lens, zoom lens, and stop), camera signal processing control, communication control, key control, and the like.

The ten-key pad 522 is used for inputting the telephone number of the called party upon placing a call, and the discrimination circuit 521 discriminates the input key. The output from the discrimination circuit 521 is input to the microcomputer 517, which executes a series of control processes for initiating a call.

The same applies to an audio signal. That is, after a voice is input from the microphone 523, the audio signal is processed by the audio signal processing circuit 524, and is input to the communication protocol circuit 515 via the audio A/D converter 525. After that, the audio signal is transmitted as a radio signal from the antenna 519 via the PHS transmitter/receiver as in the video signal.

In this embodiment, an image can be sensed by the camera, and a function of adjusting the focus on an object at an arbitrary position on the screen is available as one of functions that can be used upon image sensing. The function will be explained below.

An auto-focus signal is output from the camera signal processing circuit 512, and an image signal is gated based on arbitrarily set area setting pulses output from the area setting pulse generation circuit 526 in the AF gate circuit 527. More specifically, this block can designate an object to be focused on the screen. After that, the AF evaluation value processing circuit 529 appropriately processes the auto-focus signal, and outputs the processed signal to the microcomputer 517. The microcomputer 517 outputs a signal for driving the lens to adjust the focus on the object to be focused. The timings of pulses generated by the area setting pulse generation circuit 526 are set by the ten-key pad 522 (#0 to #9). The ten-key pad 522 is also used for inputting a telephone number, and is one of the characteristic features of this embodiment.

The operation and arrangement of the ten-key pad 522 will be explained below.

Figure 16:
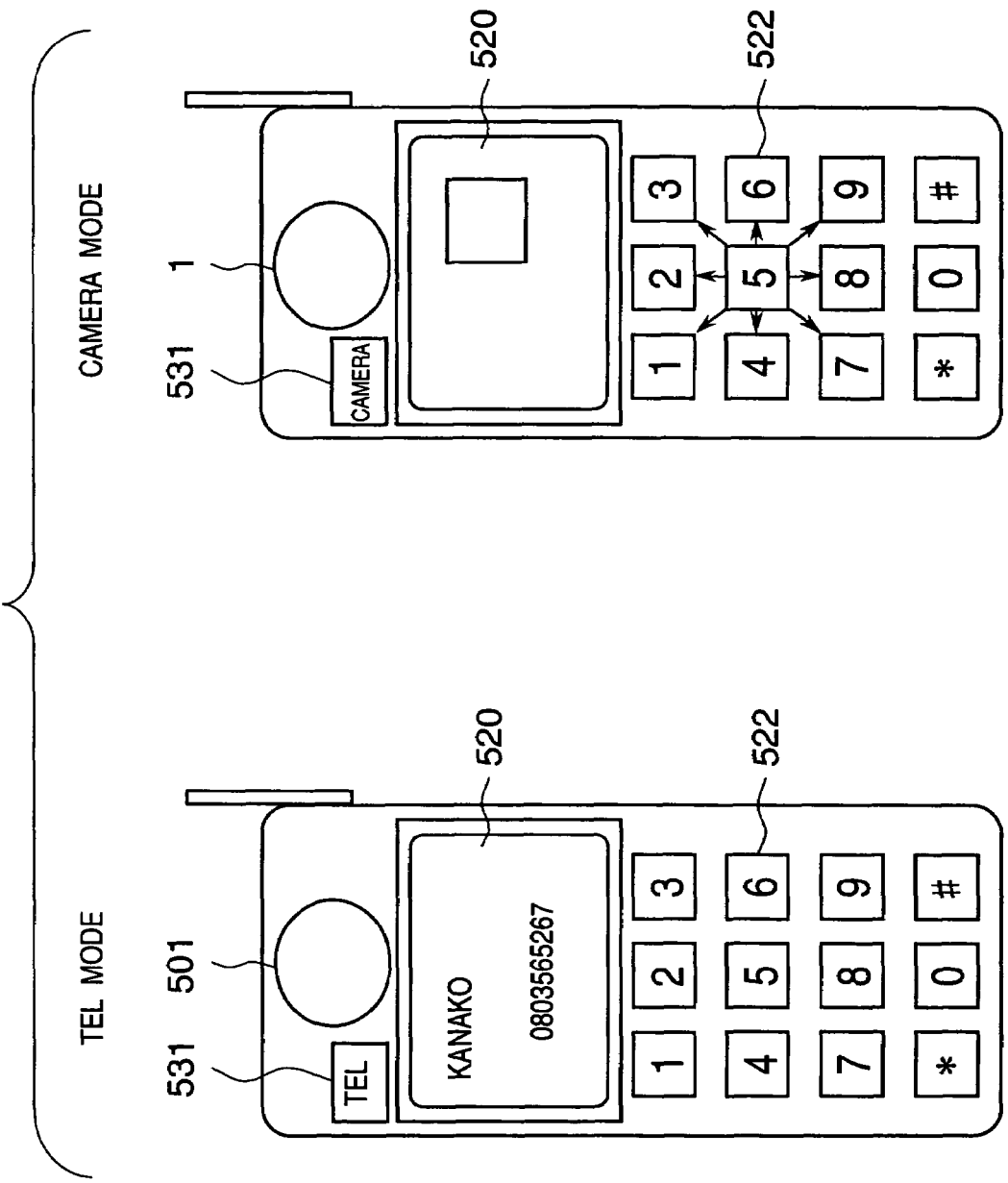
FIG. 16 shows the layout of operation switches.

The telephone mode execution switch 531 is used for selecting the telephone function upon placing a call When the telephone mode execution switch 531 has been pressed, the ten-key pad 522 has a telephone mode function shown in FIG. 16; when the switch 531 is not pressed, the ten-key pad 522 has a camera mode function shown in FIG. 16.

When the user has pressed the telephone mode execution switch 531 to place a call, the ten-key pad 522 serves as keys for inputting a telephone number, as shown in the telephone mode of FIG. 16. When the user inputs a telephone number using the ten-key pad 522, the microcomputer 517 recognizes the telephone number via the key discrimination circuit 521, and supplies a signal to the communication protocol circuit 515 to call a person corresponding to the input telephone number. After that, a call is placed to the person corresponding to the input telephone number from the antenna 519 via the PHS transmitter/receiver 516.

When the user does not make a call or is talking to another person, the ten-key pad 522 serve as keys for inputting an AF (auto-focus) set area, as shown in the camera mode in FIG. 16.

For example, when the user wants to set an area from the center toward the upper right corner, as shown in FIG. 16, he or she pushes key #3 of the ten-key pad 522, and the key discrimination circuit 521 converts that input into a signal for discriminating that key #3 has been pressed. The microcomputer 517 processes data to set an upper right area, and sends that data to the area setting pulse generation circuit 526, which generates pulses corresponding to the position of the received data. After that, the AF area gate circuit 527 gates an image signal on the basis of those pulses, i.e., passes only a focus signal within the set area. The AF evaluation value processing circuit 529 processes the focus signal to attain in-focus, and inputs the processed signal to the microcomputer 517, which outputs data for driving the lens to adjust the focus. The focus lens driving circuit 508 drives the lens based on the received data. In this way, an object within the set area can be focused.

Likewise, to move the area setting frame around #5 as the center, the user pushes key #1 (upper left), #2 (upper), #3 (upper right) #4 (left), #5 (preset at the center), #6 (right), #7 (lower left), #8 (lower), or #9 (lower right) to adjust the focus on an object within the set area he or she selected, on the basis of the same operation principle as mentioned above. The monitor 520 displays the area setting frame at that time.

Figure 17:
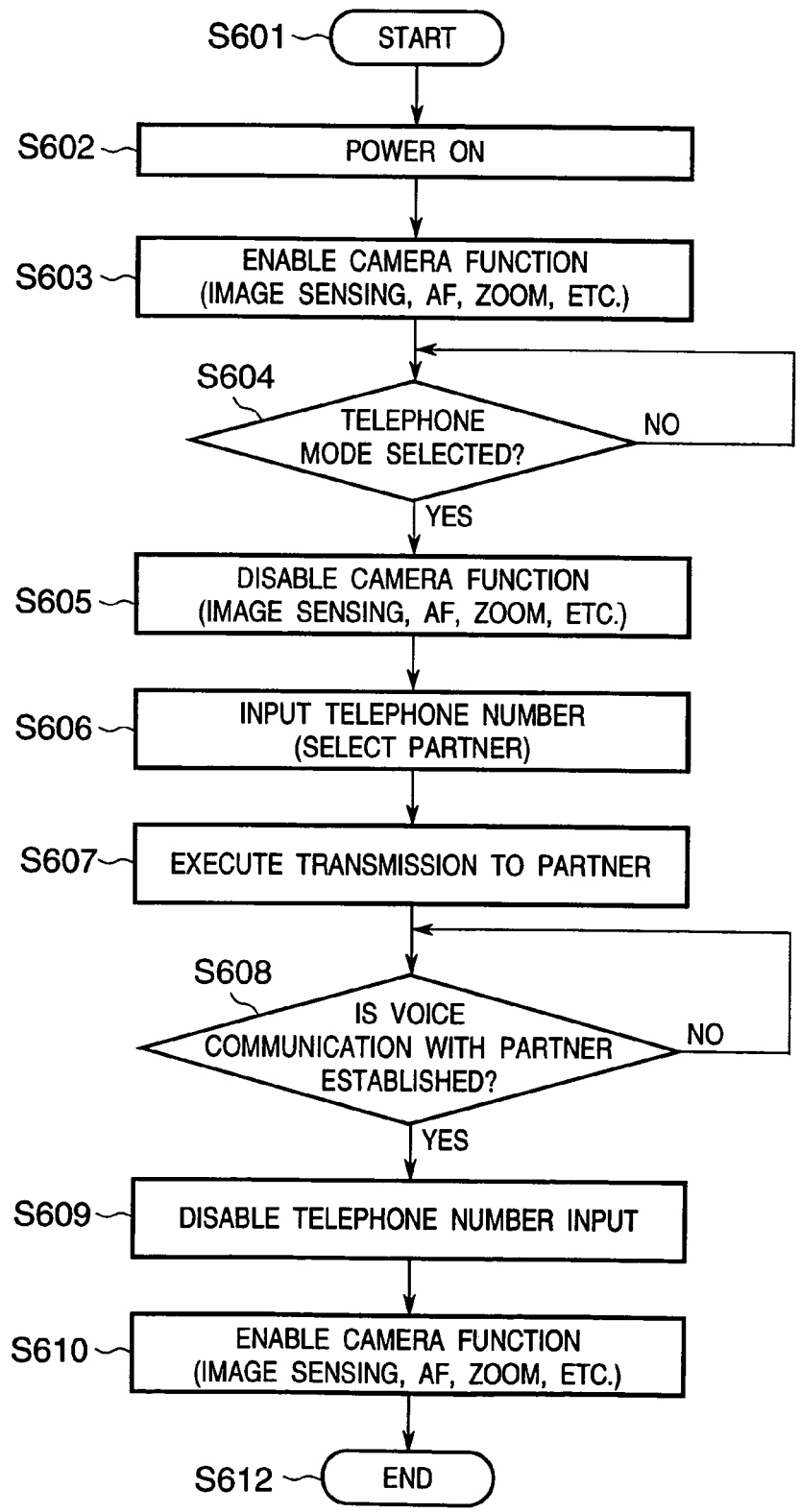
FIG. 17 is a flow chart showing the operation of the image communication apparatus of the sixth embodiment.

As described above, the characteristic feature of this embodiment is to efficiently and selectively use common switches in two functions (one of which is the telephone mode function, and the other is the camera mode function). The characteristic feature of this embodiment will be explained in more detail below with reference to the flow chart in FIG. 17. All operations in this flow chart are processed by the microcomputer 517.

When the flow starts in step S601, the user turns on the power switch of the apparatus in step S602.

Upon power ON, camera functions such as an image sensing system, AF function, ZOOM function, AF frame movement setup function, and the like, are enabled in step S603.

In step S604, the control waits until the user selects the telephone mode. If the user has pressed the telephone mode execution switch 531 to place a call, the telephone mode function is enabled.

In step S605, some of the camera functions are turned off or disabled.

After the telephone function mode is selected, the ten-key pad 522 serves as switches for inputting a telephone number to be called, and the user inputs the telephone number to be called in step S606.

In step S607, transmission to the called party is executed.

It is checked in step S608 if a voice communication with the called party has been established. If YES in step S608, some of telephone mode functions are automatically turned off in step S609. For instance, the telephone number input function is turned off.

After that, the camera mode function is turned on again in step S610 to enable the image sensing system and AF and ZOOM functions.

The operation then ends in step S612.

More specifically, as can be seen from the aforementioned flow chart, in this embodiment, two functions are assigned to common switches: one is the camera mode (image sensing mode) function, and the other is the telephone mode function. Upon depression of the telephone mode execution switch 531, the telephone mode function is enabled, and the ten-key pad 522 serves as telephone number input switches. After that, if a voice communication with a partner has been confirmed, the telephone mode function is automatically switched to the camera mode (image sensing mode) function, and the ten-key pad 522 serves as AF frame movement setup switches. Only a required function is automatically enabled when it is required in place of always enabling two functions, so as to attain power savings. Also, since two functions are attained using common switches, a compact, low-cost image communication apparatus can be provided.

Figure 18:
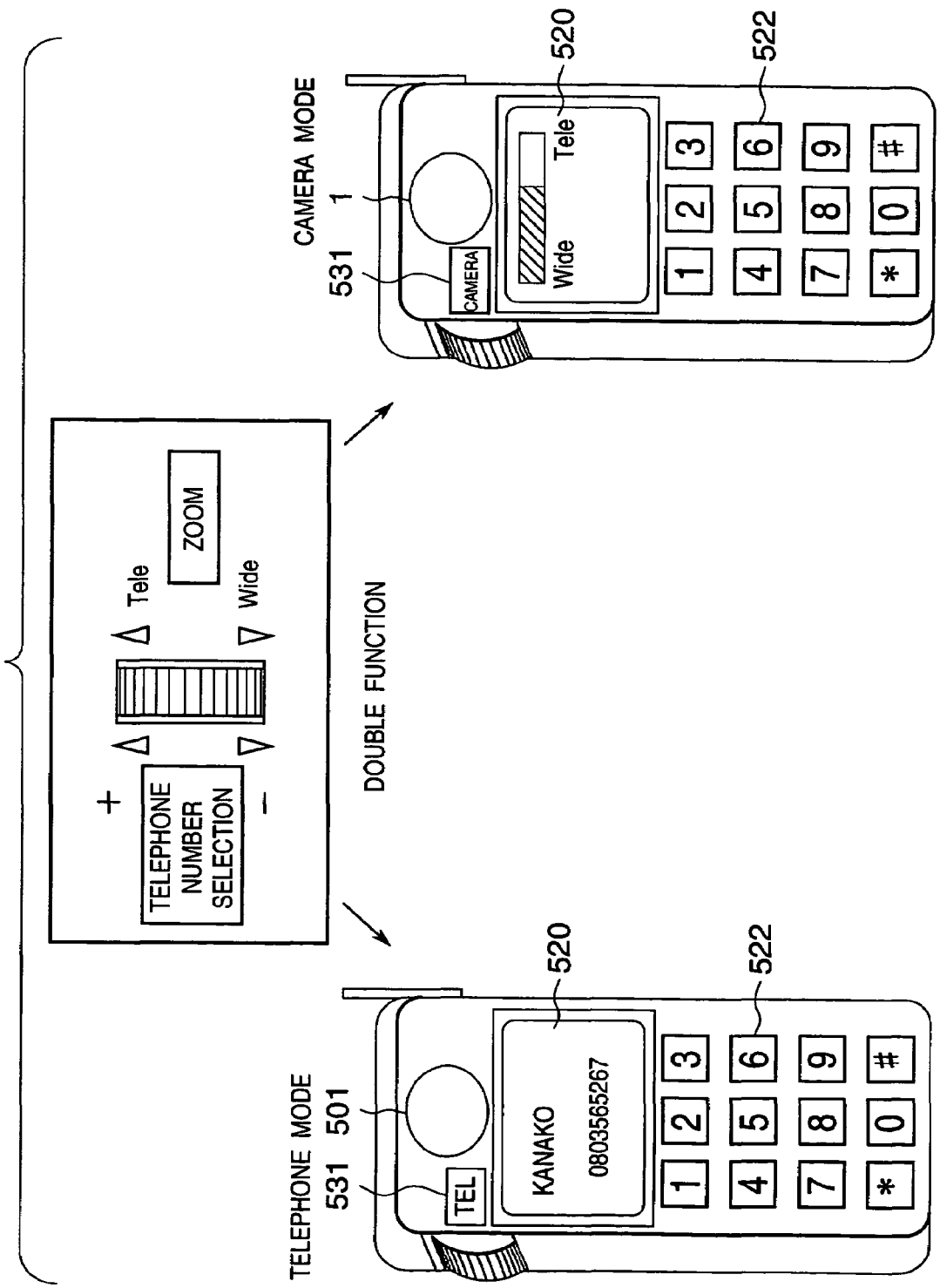
FIG. 18 shows another example of the switch layout.

FIG. 18 shows another example of common switches used in two functions in addition to the aforementioned ten-key pad. This switch is a rotary switch. As shown in FIG. 18, the switch serves as one for selecting one of telephone numbers registered in advance in the telephone mode. When the user has confirmed a voice communication with a partner, the switch is automatically switched to the one for the camera mode. In FIG. 18, the switch serves as a zoom switch.

Seventh Embodiment

Figure 19:
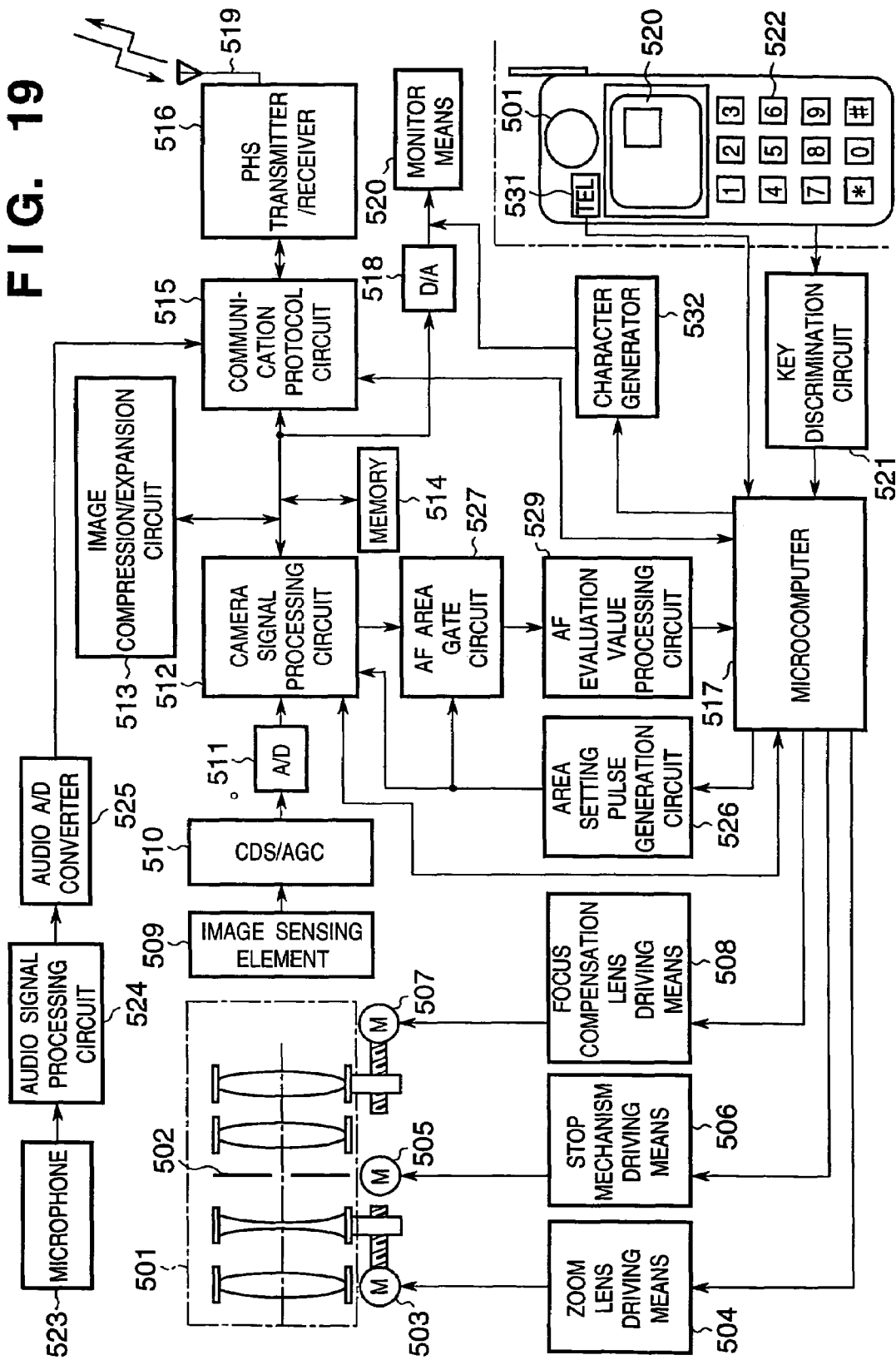
FIG. 19 is a block diagram of an image communication apparatus according to the seventh embodiment of the present invention.

FIG. 19 is a block diagram showing the arrangement of an image communication apparatus according to the seventh embodiment of the present invention. The same reference numerals in the seventh embodiment shown in FIG. 19 denote the same parts as those in the sixth embodiment shown in FIG. 15, and a detailed description thereof will be omitted.

The seventh embodiment comprises a character generator 532 unlike the sixth embodiment.

The arrangement and contents as the characteristic feature of this embodiment will be explained below.

As in the sixth embodiment described above, incoming light from an object via the lens 501 is photoelectrically converted into an electrical signal by the image sensing element 509. The electrical signal is processed by the camera signal processing circuit 512 to obtain a video signal. Furthermore, the video data is compressed by the image compression/expansion circuit 513, and the compressed data is stored in the memory 514.

The data compressed by the image compression/expansion circuit 513 is processed by the communication protocol circuit 515 to obtain data according to a prescribed communication rule, and the processed data is transmitted from the antenna 519 via the PHS transmitter/receiver 516. The data output from the camera signal processing circuit 512 is converted into an analog signal by the D/A converter 518, and the analog signal is processed to be displayed on the monitor. After that, an image is output to the monitor.

Moreover, image and audio radio signals transmitted from an external device are received by the PHS transmitter/receiver 516 via the antenna 519, and image and audio data are obtained via the communication protocol circuit 515. After that, the image data is expanded by the image compression/expansion circuit 513, and is output to the monitor via the D/A converter 518.

The microcomputer 517 controls the system of this apparatus, and performs various kinds of lens control (control of the focus lens, zoom lens, and stop), camera signal processing control, communication control, key control, and the like.

The ten-key pad 522 is used for inputting the telephone number of the called party upon placing a call, and the discrimination circuit 521 discriminates the input key. The output from the discrimination circuit 521 is input to the microcomputer 517, which executes a series of control processes for placing a call.

The same applies to an audio signal. That is, after a voice is input from the microphone 523, the audio signal is processed by the audio signal processing circuit 524, and is input to the communication protocol circuit 515 via the audio A/D converter 525. The audio signal is then transmitted as a radio signal from the antenna 519 via the PHS transmitter/receiver as in the video signal. In this embodiment, an image can be sensed by the camera, and a function of adjusting the focus on an object at an arbitrary position on the screen is available as one of functions that can be used upon image sensing. In this case, the operations that have already been described in the sixth embodiment are done.

As described in the sixth embodiment, the characteristic feature of the sixth and seventh embodiments is to efficiently and selectively use common switches in two functions (one of which is the telephone mode function, and the other is the camera mode function). The contents of that characteristic feature has already been described with reference to the flow chart in FIG. 17. Furthermore, in the seventh embodiment, the display in the telephone mode can be automatically switched between those shown in FIGS. 16 and 18.

When the user has pressed the telephone mode execution switch 531 to place a call, the microcomputer 517 outputs data to the character generator 532 to display the telephone number and called party's name on the monitor 520. When the user does not make a call or when it is confirmed that a voice communication with a partner has been established upon placing a call, the camera mode is set, and an AF frame movement setup frame or a zoom state (FIG. 18) is displayed on the monitor 520.

As has been described above, according to the sixth and seventh embodiments, in a portable device which has camera and communication functions like a videophone, a compact image communication apparatus which can efficiently and selectively use the camera and telephone functions based on the outputs from the telephone mode execution switch and a voice communication detection circuit for determining if a voice communication has been established, so as to attain power savings, and selectively use common switches in two functions (camera and telephone functions) to provide many functions without increasing the number of switches and impairing design, can be provided.

Also, a low-cost image communication apparatus which is easy to operate since it adopts an efficient switch layout can be provided.

The present invention is not limited to the above embodiments and various changes and modifications can be made within the spirit and scope of the present invention. Therefore, to apprise the public of the scope of the present invention the following claims are made.

What is claimed is:

1. An image communication apparatus comprising:
   a camera unit adapted to pickup an object image;
   a display device adapted to display at least an image picked up by said camera unit and/or a character;
   a selection device adapted to select a predetermined function from a menu which is displayed on said display device and is used for selecting or executing one of a plurality of camera control functions;
   a transmission device adapted to transmit data including an image signal picked up by said camera unit by wireless transmission; and
   a reception device adapted to receive data from another apparatus by wireless transmission,
   wherein said selection device comprises an input key for selecting or executing one of a plurality of camera control functions comprising an optical zoom function, a focus adjustment function or an exposure control function, and said input key also serves as an operation key for inputting a telephone number, and
   wherein said camera unit picks up the object image based on the camera control function selected by said selection device.

2. The apparatus according to claim 1, wherein said display device further displays an image signal in the data received from the other apparatus.

3. An image communication apparatus comprising:
   a camera unit adapted to pickup an object image;
   a transmission/reception device adapted to transmit/receive data;
   an operation device adapted to control an optical zoom function, a focus adjustment function or an exposure control function of said camera unit and said transmission/reception device;
   a switching device adapted to switch said operation device between a state for controlling said camera unit, and a state for operating said transmission/reception device; and
   an input device adapted to be used as an input key for inputting an instruction for a control of one of an optical zoom function, a focus adjustment function or an exposure control function of said camera unit executed by said operation device and also adapted to be used as an input key for inputting an instruction for a control of said transmission/reception device executed by said operation device,
   wherein said camera unit picks up the object image based on the control of said operation device.

4. The apparatus according to claim 3, further comprising selection device adapted to select a transmission/reception mode by said transmission/reception device, and wherein when said selection device selects the transmission/reception mode, said switching device automatically switches said operation device to the state for operating said transmission/reception device.

5. The apparatus according to claim 4, wherein said selection device comprises a single button, and the transmission/reception mode and a camera mode are alternately selected every time said button is depressed once.

6. The apparatus according to claim 4, wherein said switching device automatically switches said operation device to the state for operating said camera unit upon completion of operation pertaining to transmission/reception using said operation device.

7. The apparatus according to claim 3, further comprising a display adapted to display an image sensed by said camera unit.

8. The apparatus according to claim 7, wherein said display further displays information which pertains to transmission/reception.

9. The apparatus according to claim 8, wherein in the state which allows said operation device to operate said camera unit, said display displays an image sensed by said camera unit, and in the state which allows said operation device to operate said transmission/reception device, said display displays the information that pertains to transmission/reception.

10. The apparatus according to claim 7, wherein said operation device can select an object to be focused from an image on said display in the state for operating said camera unit.

11. The apparatus according to claim 10, wherein an area of the object to be focused is displayed on said display.

12. The apparatus according to claim 3, wherein said input device comprises a ten-key pad.

13. The apparatus according to claim 3, wherein said input device comprises a rotary switch.

14. An image communication apparatus comprising:
a camera unit adapted to pickup an object image;
display device adapted to display at least an image picked up by said camera unit;
camera control area setting device adapted to set and display camera control area for controlling an optical zoom function, a focus adjustment function or an exposure control function on the image, displayed on said display device, on a screen of said display device;
transmission device adapted to transmit data including an image signal picked up by said camera unit outward; and
switching device adapted to switch said camera control area setting device to a condition capable of entering a telephone number when a telephone communication is carried out by using said transmission device,
wherein said camera unit picks up the object image after said camera unit executes an adjustment relating an image pick-up operation with respect to the camera control area set by said camera control area setting device.

15. An apparatus according to claim 14, further comprising a focus adjusting device for adjusting a focusing condition of incident light to said camera unit on the basis of an image signal of the some area which is set by the area setting device.

16. An apparatus according to claim 14, further comprising an exposure control device for controlling exposure amount on the basis of an image signal of the same area which is set by the area setting device.

17. An apparatus according to claim 14, further comprising expansion control device for expanding an image of the some area to overall area of the screen of the display device.

18. An apparatus according to claim 14, wherein said area setting device includes ten key.

19. An image communication apparatus comprising:
a camera unit adapted to pickup an object image;
display device adapted to display at least an image picked up by said camera unit;
an operation device adapted to change a camera optical zooming condition of said camera unit with displaying the camera zooming condition on said display device;
transmission device adapted to transmit data including an image signal picked up by said camera unit outward; and
switching device adapted to switch said operation device to a condition capable of selecting a telephone number when a telephone communication is carried out by using said transmission device,
wherein said camera unit picks up the object image based on the camera optical zooming condition changed by said operation device.

20. An apparatus according to claim 19, wherein said switching device changes the condition of said operation device from a telephone number entering condition to a zoom controlling condition on the basis of a detection where said transmission device is on the line.

21. A communication apparatus comprising:
a camera unit adapted to pickup an object image;
display device adapted to display at least an image picked up by said camera unit;
a manual member adapted to control a camera function;
communication device adapted to communicate with an external unit;
detecting device adapted to detect an establishment of communication between said the communication device and the external unit;
and switching device adapted to switch function of said manual member between first function for selecting the external unit and second function for controlling an optical zoom function, a focus adjustment function or an exposure control function of said camera unit according to the establishment status of the communication detected by said detecting device,
wherein said camera unit picks up the object image based on the control of the second function.

22. An apparatus according to claim 21, wherein said display device displays the control status of the camera in response to the detection of the establishment of communication by said detecting device.

23. A communication apparatus comprising:
a camera unit adapted to pickup an object image;
operating device adapted to control an operation of said camera unit;
communication device adapted to communicate with an external unit;
detecting device adapted to detect an establishment of communication between said communication device and the external unit; and
display device adapted to automatically display a controlling condition of said camera unit in response to the detection of the establishment of the communication by said detecting device,
wherein said display device automatically changes a display from a display for selecting the external unit or for indicating the external unit to a display for controlling said camera unit in response to the detection of the establishment of the communication,
wherein said display device automatically changes a display to a display for controlling said camera unit in response to the detection of the establishment of at least one of a wireless communication and a telephone communication.

24. An apparatus according to claim 23, further comprising switching device for switching modes of the operating device between a mode for designating the external unit and another mode for controlling said camera unit according to the detection of the establishment of the communication.

25. A communication apparatus comprising:
a camera unit adapted to pick up an object image;
operating device adapted to control an operation of said camera unit;
communication device adapted to communicate with an external unit;
detecting device adapted to detect an establishment of communication between said communication device and the external unit; and
switching device adapted to automatically switch modes of said operating device from a first mode for selecting the external unit to a second mode for controlling the operation of said camera unit in response to the detection of the establishment of the communication by said detecting device
wherein said camera unit picks up the object image based on the control of the second mode of said operating device,
wherein said switching device switches mode of said operating device to the second mode in response to the detection of the establishment of at least one of a wireless communication and a telephone communication.

26. An apparatus according to claim 25, further comprising display device for displaying at least the image sensed by said camera unit.

27. An apparatus according to claim 26, wherein said display device displays a controlling condition of said camera unit in response to the establishment of the communication.

28. The apparatus according to claim 1, wherein said camera unit includes an image sensing element photoelectrically converting light coming from an object, and outputting an image signal.

29. The apparatus according to claim 3, wherein said camera unit includes an image sensing element photoelectrically converting light coming from an object, and outputting an image signal.

30. The apparatus according to claim 14, wherein said camera unit includes an image sensing element photoelectrically converting light coming from an object, and outputting an image signal.

31. The apparatus according to claim 19, wherein said camera unit includes an image sensing element photoelectrically converting light coming from an object, and outputting an image signal.

32. The apparatus according to claim 21, wherein said camera unit includes an image sensing element photoelectrically converting light coming from an object, and outputting an image signal.

33. The apparatus according to claim 23, wherein said camera unit includes an image sensing element photoelectrically converting light coming from an object, and outputting an image signal.

34. The apparatus according to claim 25, wherein said camera unit includes an image sensing element photoelectrically converting light coming from an object, and outputting an image signal.

35. The apparatus according to claim 1, wherein the telephone number is input by inputting a numeral by the operation key for inputting a telephone number.

36. The apparatus according to claim 1, wherein the one of the plurality of camera control functions is a signal processing function.

37. The apparatus according to claim 1, wherein the one of the plurality of camera control functions is a zooming function of an optical lens.

38. The apparatus according to claim 3, wherein said operation device controls a signal processing operation.

39. The apparatus according to claim 3, wherein said operation device controls a zooming operation of an optical lens.

40. The apparatus according to claim 3, wherein said input device inputs a numeral for inputting a telephone number.

41. The apparatus according to claim 14, wherein the adjustment relating an image pick-up operation is a signal processing operation.

42. The apparatus according to claim 14, wherein the adjustment relating an image pick-up operation is a zooming operation of an optical lens.

43. The apparatus according to claim 19, wherein said operation device is a rotary switch.

44. The apparatus according to claim 19, wherein an optical lens is driven when the camera zooming condition is changed.

45. The apparatus according to claim 21, wherein said switching device automatically switches function of said manual member between the first function and the second function in accordance with a detecting result of said detecting device.

46. The apparatus according to claim 45, wherein said switching device switches function of said manual member from the first function to the second function when said detecting device detects the establishment of the communication.

* * * * *

UNITED STATES PATENT AND TRADEMARK OFFICE
CERTIFICATE OF CORRECTION

PATENT NO.        : 7,317,475 B2                                        Page 1 of 1
APPLICATION NO.  : 10/861471
DATED             : January 8, 2008
INVENTOR(S)       : Arai et al.

It is certified that error appears in the above-identified patent and that said Letters Patent is hereby corrected as shown below:

In Column 22, Line 43, change "unit and" to --unit, and--.

Signed and Sealed this

Third Day of June, 2008

JON W. DUDAS
*Director of the United States Patent and Trademark Office*